United States Patent [19]

Kinkade

[11] 4,218,765
[45] Aug. 19, 1980

[54] TWO-DIMENSIONAL FREQUENCY DOMAIN FILTERING

[75] Inventor: Robert R. Kinkade, Tulsa, Okla.

[73] Assignee: Standard Oil Company (Indiana), Chicago, Ill.

[21] Appl. No.: 511,873

[22] Filed: Oct. 3, 1974

[51] Int. Cl.$^2$ .......................... G01V 1/28; G01V 1/36
[52] U.S. Cl. ........................................ 367/45; 367/49; 367/67; 364/421
[58] Field of Search ...... 340/7 R, 15.5 DP, 15.5 VD, 340/15.5 F, 15.5 AP; 324/77 B; 235/153 AK, 183; 444/1; 364/421

[56] References Cited

U.S. PATENT DOCUMENTS

| | | | |
|---|---|---|---|
| 3,274,541 | 9/1966 | Embree | 340/15.5 F |
| 3,541,458 | 11/1970 | Klund | 324/77 B |
| 3,705,981 | 12/1972 | Harmuth | 235/183 |
| 3,717,812 | 2/1973 | Hirsch | 324/77 B |

OTHER PUBLICATIONS

Dobrin et al., "Velocity and Frequency Filtering . . .", 12/65, pp. 1144–1178, Geophysics, vol. 30, #6.
Selzer, "Improving Biomedical Images Quality . . .", 10/1/68, pp. 1–22, Tech. Report 32–1336, Jet Prop. Lab. at C.I.T.
Lee et al., "Considerations in Optical Filtering", 10/71, 5-1/3PP, Proc. of 2-D Digital Signal Proc. Conference, IEEE.
Hawes et al., "Some Effects of Spatial Filters on Signals", 7/74, Geophysics, vol. 39, #4, pp. 464–498.

Primary Examiner—Nelson Moskowitz
Attorney, Agent, or Firm—Robert B. Stevenson

[57] ABSTRACT

This specification discloses an automatic computer-implemented technique for filtering a two-dimensional array of data in the frequency domain. The program converts the array of numbers by Fourier transformation into the real and imaginary part of the frequency domain. In this domain, undesired waves present in the original array can be completely removed by the elimination from the frequency domain of the components of the Fourier-transformed array which fall within (or, if desired, outside of) a convex polygon of arbitrary shape. The system then re-transforms the remaining data back to the time domain, but the undesired components have been filtered. The program can cause the computer to produce a visual reproduction of the filtered array, or it may simply re-format the data of this array on a tape for further computer processing. Accordingly, this invention permits precision spatial filtering of undesired components from the original array. The original array may represent the digitized data from a seismic section, or the amplitude and frequency response of a two-dimensional array of geophones to a steady state alternating seismic wave from a source. A rapid version of large automatic Fourier transformation and re-transformation is included.

8 Claims, 9 Drawing Figures

(a)

(b)

(c)

(d)

TWO-DIMENSIONAL FREQUENCY DOMAIN FILTERING

BACKGROUND OF THE INVENTION

1. Field of the Invention

Attempts have also been made, with varying degrees of success, to apply the technique of Fourier transformation in the analysis of two-dimensional arrays of traveling waves, so that after the preparation of the original array it is possible to observe after suitable two-dimensional transformation into the frequency-wave number domain, the Fourier components of these various traveling waves. This, in turn, has led to the possibility of removing the effects of certain undesired waves by the elimination of the Fourier components of such waves from the transformed array, then re-transforming the remainder back to the original time-spacing domain.

Where reference is made to "two-dimensional data" or two-dimensional arrays, or the like, it should be understood how such phraseology is used throughout the specification and claims. In ordinary seismic prospecting, the received seismic waves at any geophone or geophone group represent (1) an amplitude, (2) the time after the source was actuated, and (3) a distance from source to receiver. Similarly, in seismic holography, the received seismic waves represent (1) an amplitude, (2) a phase relative to the source, and (3) two distances (ground coordinates) of receiver with respect to source. For the seismic reflection case, two-dimensional data refers to the fact that the usual visual presentation is amplitude in terms of the two dimensions of time and distance. In seismic holography, the visual presentation depends on both amplitude and phase in terms of the two dimensions of distance from the source. Accordingly, the two-dimensional data here are both amplitude and phase (usually presented as a single complex value) per data point, whose real and/or imaginary parts are plotted in terms of the two coordinate distances (such as N-S and E-W distances from source to receiver) defining each such data point. In both cases, the values at the data point are due to the passage of traveling seismic waves past the receivers.

It is to be understood that equivalent data are obtained similarly in other fields of physics, which can be similarly filtered by the method presented here.

2. Description of the Prior Art

One field in which there has been considerable application of spatial filtering techniques is in optical processing of seismic sections. Here the original array, which is to be Fourier-transformed into the frequency domain, is a two-dimensional matrix of real numbers. A photographic transparency of a seismic cross section is illuminated and the modulated light beam passed through a lens to form the Fourier transformation, which is filtered by masks in the Fourier plane, and the remainder transformed back.

For reference, see the article of P. L. Jackson, "Analysis of Variable-Density Seismograms by Means of Optical Diffraction", *Geophysics*, Vol. XXX, No. 1, p. 5 ff. He points out, for example, that illumination of a variable density transparency of the seismic section by a specially coherent monochromatic light source presents a visual object, a real two-dimensional array, and that, by passage of this image into a special optical system, it is possible to obtain at the principal focus of an objective lens the Fourier transform of the original real array, which is in a frequency-wave number domain, and therefore can be filtered. He shows various types of filters which are optical masks that can be employed in this optical arrangement, and the retransformed array after the optical filtration. This is only one of a number of articles on this subject. Additional references are found in the articles, "Velocity and Frequency Filtering of Seismic Data Using Laser Light", by Dobrin, Ingalls, and Long, *Geophysics*, XXX, No. 6, pp. 1144 ff, and "Optical Processing and Interpretation", by Fitton and Dobrin, *Geophysics*, Vol. XXXII, pp. 801 ff.

A related system for processing a seismic record section in such a way that seismic events with dips in a given range are preserved with no alteration over a wide frequency band, while seismic events with dips outside this specified range are severely attenuated, is described in the article, "Wide-Band Velocity Filtering—The Pie-Slice Process", by Embree, Burg, and Backus, *Geophysics, Vol. XXVIII*, No. 6, p. 948 ff. (See also U.S. Pat. No. 3,274,541 Embree.) In theory, this system relies on the conversion of seismic data obtained at the various geophones at differing distances from an impulsive source, by two-dimensional Fourier transformation, into the corresponding frequency and wave number (inverse of apparent wave length) plot. It was recognized that desired signals, i.e., those for reflected waves, differed in a systematic way from the low-velocity ground roll or high-velocity noise. In effect, the desired signals lay in one part of the f-k (frequency-wave number) plot of the data, and various kinds of noise lay in other sectors. Thus, by elimination of data from these other sectors and re-transforming, the resultant plot should involve mostly the signal range desired. This required for implementation a method in which, first, a plurality of reproducible input data consisting of seismic traces was obtained at different offset distances from the source; second, several of these input traces were individually filtered through filters, the individual filter being appropriately designed for the particular trace (corresponding to a particular offset distance from source to geophone); and, third, the responses of the plurality of filtered input traces was added together to form one equivalent output trace. This process was then repeated, leaving out one of the previously used input traces and adding another input trace, again using the appropriate filters, etc. This process is shown rather well on page 952 of the Embree, Burg, and Backus reference. Corresponding theory is given in the appendix to this reference. There it shows how the filters are designed in either in the time domain or in the frequency-wave number domain.

This sort of arrangement is at best only an approximation to the simultaneous use of all input data in a particular geophone array, and applying to the Fourier transform of these data an appropriate filter. This latter process can be accomplished using my invention, even for a relatively large amount of data.

Another point which should be made is that it is by now well understood that filtering, as the term is generally used, can be accomplished in quite a number of ways which are basically alternate schemes but which are all related. This is pointed out, among other places, by Mark Smith, in his article, "A Review of Methods of Filtering Seismic Data", which appeared in *Geophysics*, Vol. XXIII, No. 1 (January 1958), at pp. 44, et seq.

Other references could be given. However, the above is enough to illustrate the principles.

It is also known that it is possible to represent the response of a two-dimensional array of detectors to a steady state excitation from a source at an arbitrarily determined location. The data can be shown in a geometrically similar two-dimensional array of a set of numbers, in which the numbers assigned to any one point (corresponding geometrically to the location of the detector) represent the amplitude and phase response of the geophone to the impressed signal. Since this is steady state, simple harmonic motion, these numbers can be complex. The array shows the waves traveling directly from the known source to the particular detector, but also shows other waves which are of the same frequency as that of the source due to virtual sources (such as reflectors), diffraction from objects in the field, etc. This is seismic holography. See, for example, U.S. Pat. Nos. 3,400,363 and 3,461,420 Silverman, for seismic holographs. Photographs of real objects (not holograms) have been processed (filtered) after two-dimensional Fourier transformation. However, it should be pointed out that no reference has been found teaching how to apply such filtering technique to such data. The array, for example, can be analyzed by two-dimensional Fourier transformation, to separate out the effects of the virtual sources, diffraction, and the like.

SUMMARY OF THE INVENTION

My new process acts on a two-dimensional array of numbers. The data are fed into the input of a specially programmed digital computer. This computer rapidly produces a second array (which can be plotted) very closely related to the two-dimensional discrete Fourier transform of the original array. This array can then be modified in an easily specified and nearly automatic manner by the programmed computer so that certain of the data are either removed or emphasized from the Fourier transform in the f-k plane. Following this "editing" of the data, which is at the control of the user, the result is inverse transformed by yield the original data, modified as desired (that is, in a filtered state), which is plotted for presentation to the eye of the interpreter.

It is to be understood that the array of input data is subjected to a true two-dimensional application of the discrete Fourier transform. This process had previously been considered to be impractical in terms of usual quantities of real data, i.e., required far too great a period of processing time. However, by my method, processing can be handled in relatively short time. The quantity of data that can be handled in one pass has been arranged in the existing version of this system to accept up to 1,024 traces, each comprising 1,024 data values. This involves the transformation of over a million numbers. The transformed data may be "edited" by a particular "operator," which can be easily specified, rapidly applied, and changed each time this method is employed, if desired.

DESCRIPTION OF THE PREFERRED EMBODIMENT

Figure 1:
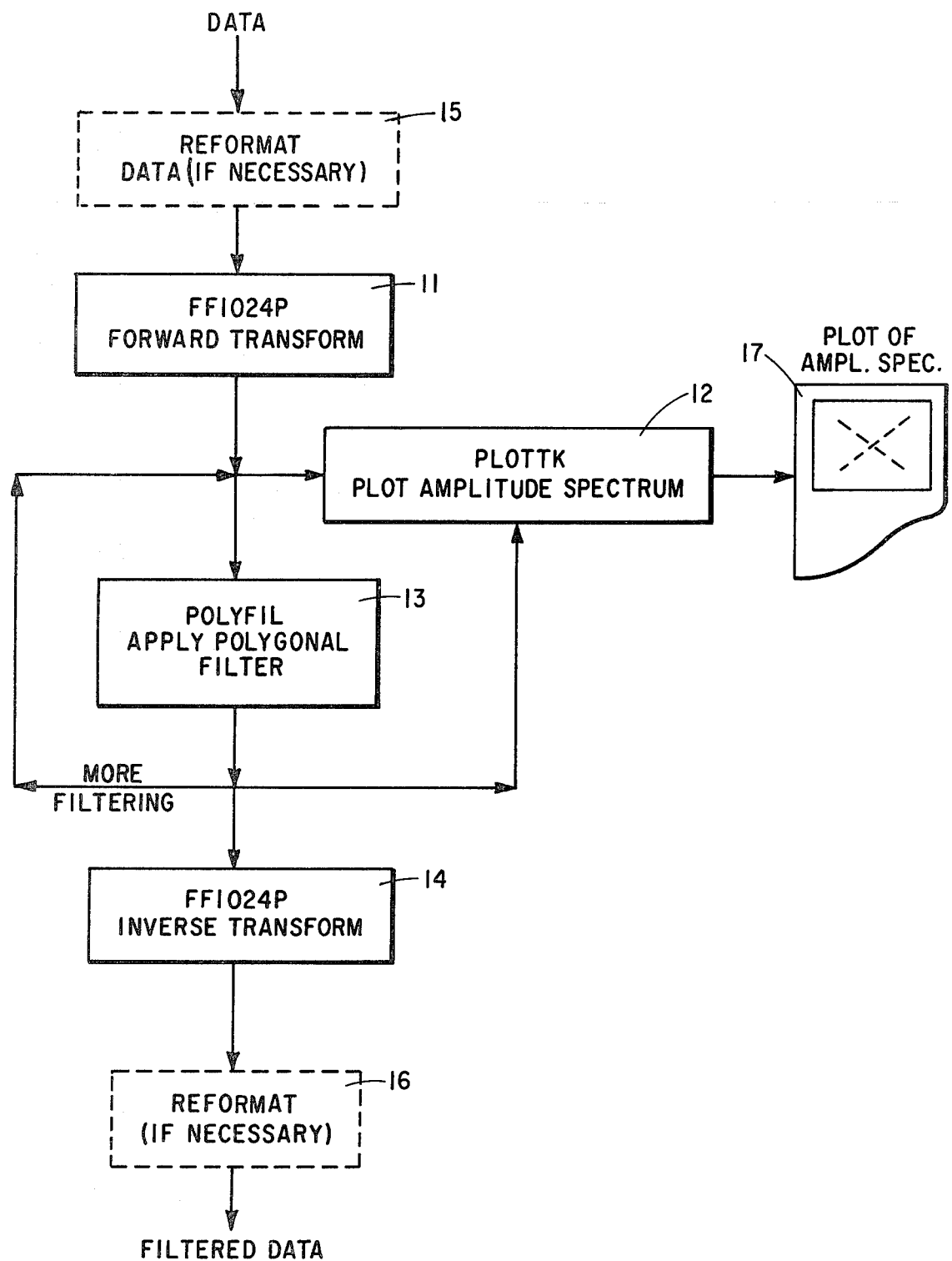
FIG. 1 is a block diagram of the main computer processes applied in carrying out the method of the invention.

Before proceeding to a description of the method itself, it is considered desirable to deal with some of the difficulties that have been found with prior attempts to use the Fourier transform in connection with the filtering of seismic data. Remember that in order to produce optically a Fourier transform of a seismic section, it is necessary to produce a transparency on film of the section. This involves a number of unfortunate consequences. In the first place, the dynamic range on the transparency between film "white" and "black" is much less than the dynamic range of the seismic information. This results in a loss of detail, or resolution. Also, the preparation of a transparency on film involves the fact that the contrast response of all film (the H and D curve) is basically non-linear, and therefore the original data have been further amplitude-distorted. Usually some sort of a filter has been incorporated or is inherently present in the plotter used to make the unprocessed positive section which is photographed to make the transparency. This results in a failure to reproduce the high frequency components of the original data, further decreasing the resolution of the unprocessed section, and therefore of the resultant transparency. Finally, the film darkening responds to the power spectra (not the amplitude and frequency spectra) of the data which are imposed upon it, which constitutes a still different distortion of the original data.

In contrast to this, my program can be used to operate on the digitized data obtained from the field geophone response. Since the processes involved in transposing and transforming in my invention are linear, the dynamic range and frequency range can be fully preserved throughout the processing.

Another difficulty with the prior use of the optical filtering process is that the transparency produced from the plotter inherently introduces seismic noise by the plotting of the data. One trace after another is plotted side by side. There are inherently produced a plurality of vertical white lines: those between adjacent traces and those between adjacent records as well as other distortions caused by mechanical inaccuracies in the plotter. Hence, the use of optical processing must necessarily introduce horizontal noise components.

The use of my system (which incidentally does not produce a true Fourier transform, but its full equivalent), is not subject to this difficulty, as will appear later.

The quantity of data which can be effectively processed is much greater than is usual with two-dimensional Fourier transforms. The present version of my process will accept up to a total of 1,024 seismic traces, each having 1,024 data values. By reprogramming larger matrices can be employed if desired.

The two-dimensional Fourier transform is never actually obtained except in making the plot which the user observes. Instead, an array is constructed which is the matrix transpose of the Fourier transform with diagonally opposite quadrants interchanged. This result, which might be considered a difficulty in the system, actually yields a very considerable increase in efficiency of the operation, and therefore markedly decreases the processing time involved. Next, the "operator" which is used to act on this equivalent of the Fourier transform of the data to eliminate or enhance certain waves is in the form of a convex polygon of a maximum number of sides which can be specified. (The present version employs up to 10). This is specified and automatically applied in a single pass through the computer, so it need not be generated manually and then applied, as in optical processing. (See the References given above). The f-k plot prepared is in its proper orientation, and is obtained without having to employ the computer to actually transpose the spectrum. This is accomplished by taking advantage of a 90° rotation of a plot; again there is a significant reduction in computer time required to generate the plot.

As a result, the programs disclosed in this system can be employed to process data in a true, linear Fourier transform at much greater total computation speeds than previously available. Basically, the computer program of my invention can be considered to be a "package" of three smaller programs. These permit the user wide flexibility in the design and application of filters of a very general nature. While described in connection with processing of seismic record sections or seismic holographic data, it will be apparent to those skilled in such methodology that it can also be employed with other types of arrays of complex data. The user may easily specially adapt the form of filter operator to his own problem or application. Also, the filtering can be made iterative in the sense that the data may be successively reprocessed without introducing distortion, so as to use a very complicated composite of polygonal pass or reject regions.

The operators are very easy for the user to describe, since he only need specify the f (frequency) and k (wave number) coordinates of each of the vertices of the polygon.

It has been recognized in the optical filtering of seismic data that the actual filters used produce two additional difficulties to those mentioned above. One lies in the fact that the filter which is employed, which is a mask of some form or another, must be one which is physically realizable without the mechanical support of the mask in turn acting as a mask itself. (Masks made of opaque film supported on a transparent glass support can be made, but are fragile, expensive, and almost never can be prepared without defects such as spots or smears in the clear areas and holes in the opaque areas). Also, such masks have sharp edges. This must necessarily produce a filter operator which has very sharp cutoff. This inevitably causes "ringing" in the processing. My operator can be modified by applying a function such as cosine-tapered band to all the outer edges of the polygon. The width of the may be specified by the user. Thus, the cutoff rate may be selected to satisfactorily reduce ringing effects. This polygon has, of course, nothing equivalent to a mask support, so filter operators may be designed with characteristics impossible to duplicate by physical masks.

The method of the present invention can be practiced using several well known types of computing apparatus. It is particularly suitable for use with a general purpose digital computer. One particular computing system used in practicing the method is supplied by International Business Machines, Inc., under the general model designation 360/165-KJ and includes the following components:

1432—Buffer Expander
3850—Extended Channel
4520—High Speed Multiply Unit
2870—Byte Multiplexer
3811—Controller
3211—Printer
3066—Line Console
2501—Card Reader
2860—Selector Channel
3803—Tape Controller
3420—Tape Drives (2)
2880—Block Multiplexor Channel
3830—Controller
3330—Disk Drives (3)

While the invention can be implemented by various programs, one suitable program specified in the FORTRAN language (IBM FORTRAN IV), useful on practically all digital computers, is given below. For a better understanding of the use of FORTRAN statements, reference should be made to "Introduction to FORTRAN", by S. C. Plumb, McGraw-Hill Book Company, New York, N.Y.

The plotting of the data has been carried out using the Interdata Minicomputer Model 70 connected through an interface controller to a Geospace Model 202 Plotter. The following peripheral equipment are used in this connection:
Model 1400—TEC Console Input/Output Drive
Model 6024—Mohawk Card Reader
Model 44—Diablo Disk Drive
Model 8640—Pertec Tape Drive (2)

General Description

In general, the package operates as follows with reference to the general flow chart, FIG. 1: the input data are transformed by the program called FF1024P in block 11, marked "Forward Transform". The data which are presented to this program will be that present on a tape. This program 11 transforms the input data into the two-dimensional discrete Fourier transform of that data. The amplitude spectrum can then be plotted using the PLOTKK Program 12, FIG. 1. The user may then study the plotted amplitude spectrum and design and apply a polygonal filter operator. The program POLYFIL, 13, generates this filter operator and applies it to the spectrum produced by the Forward Transform program 11. The modified spectrum may then be plotted, if desired, using again the program PLOTKK, and the spectrum may be further modified by repeated application of the program POLYFIL, No. 13. When the user is satisfied with the filter operator, the filtered spectrum is reverse transformed in program 14 to produce as output the suitably filtered data.

We now consider this overall process in somewhat more detail, before separately describing the individual programs.

The input data may be, for example, either a seismic section of up to 1,024 traces of 1,024 samples each, or a hologram of up to 1,024 by 1,024 complex numbers, i.e., each number having a real and an imaginary component. The two-dimensional discrete Fourier transform of the input data is calculated using the Forward Transform program 11 of FIG. 1, yielding a complex spectrum array. This spectrum array is actually the transpose of the Fourier spectrum, with the diagonally opposite quadrants interchanged. Normal procedure the first time an operator is to be designed by the user, is to generate a plot of the amplitude of the spectrum using the progam PLOTKK (12, FIG. 1), which rearranges the spectrum so that the plot is correctly oriented to the user. From this plot, the user selects a polygonal area as to which he wishes either to pass or reject the point values associated with the coordinates of the two-dimensional data. This polygon is described by specifying the coordinates of the vertices of the polygon in units depending on the number of samples on the plot, with the point (0,0) as the coordinates of the center. The coordinates of the vertices (given in cyclic order around this polygon) are then supplied as input to the program POLYFIL (13, FIG. 1), together with information as to whether a single region (for complex input data) or two regions symmetrically located about the center (for real input data) are to be used, and whether the region or regions in the polygon are to be passed or rejected. In addition, to reduce the phenomenon usually referred to as "ringing", which results from application of a sharp cutoff filter, a taper band around the periphery of the polygon(s) may be specified. In this region, the spectrum is "cosine tapered".

Program POLYFIL then accepts the complex spectrum output from the forward transform program 11, and, automatically taking into account the fact that it is transposed and the quadrants are interchanged, it processes the spectrum trace by trace. For each point, it determines its correct coordinates, tests to see whether the point lies within or outside the polygon, and, if outside, whether it is within the taper band specified. It then takes appropriate action for the point value, i.e., either zeros it, leaves it unchanged, or multiplies it by a factor between 0 and 1 (if in the taper band). The actual processing occurs in a subroutine called PLYFIL of program POLYFIL (13).

If the data are real, as in the case of a seismic section, then each plane wave contributes 2 points to the Fourier spectrum, symmetrically located with respect to the origin, i.e., they are complex conjugates, and both designate the same wave event in the original data (see, for example, any of the articles already cited for Jackson, Dobrin, et al., or Fitton and Dobrin). Consequently, to process real data, both the specified polygon and its "reflection" about the origin must be passed or rejected. The main program (POLYFIL) automatically handles this situation by either of two methods, depending on whether the polygons are to be passed or rejected. If they are to be rejected, it calls subroutine PLYFIL once for each polygon, placing the output on a temporary sequential file in the computer. It then changes the signs of the coordinates of the polygon vertices and calls PLYFIL again, processing the output from the first call to reject the second polygon.

The case of passing the polygons is somewhat more complicated because passing one polygon implies rejecting (that is, zeroing) the symmetrically located polygon, which could not then be retrieved. Actually, in this case, the main POLYFIL program calls PLYFIL twice, once for each polygon, using the value −1 for the input for logical unit number LUI (this is described in more detail later). Subroutine PLYFIL recognizes this, and, instead of processing input data, it generates traces of complex numbers (1, 0), (that is, real part=1, imaginary part=0), and processes them, resulting in an output array which is the filter operator. The operators for the two polygons are thus generated, stored on temporary files in the computer, then read, added together, and the resulting operator applied to the spectrum of the data.

The output from POLYFIL, 13, may then be plotted with the program PLOTKK, 12, if desired, to assure that the correct action was taken. Then, the spectrum may be reprocessed by the program POLYFIL, 13, if desired, so as to build up a more complicated filter operator. Whether or not this is done, finally the inverse transform of the resultant spectrum is calculated using again the program FF1024 (indicated on FIG. 1 as No. 14), and the result is the correctly oriented two-dimensionally filtered data, which is either obtained on computer tape as from the computer, or, if desired, can be reformatted for further handling.

It should be noted that the input and output from this processing package is in the form of 1,024 records of 1,024 complex numbers in internal machine floating point format. (The exact format may therefore vary from one computer to another. Hence, the manuals for the Fortran system to be useed should be consulted.) Because of this, and the fact that seismic data are usually stored on tapes with a special format, it may be necessary to reformat the data before using the package, and again possibly after completing use of the process. This is the reason for showing on FIG. 1 in dashed lines a reformatting of the data at reference numbers 15 and 16. In particular, real data values must be represented as complex data with each real point value accompanied by a zero imaginary part, before applying the FORWARD TRANSFORM program 11. This means that if the data are presented on a tape such that the consecutive individual values appearing on the tape are the real values, reformatting is necessary so that each value representing the actual data is followed consecutively by a zero value representing the zero imaginary part of the complex data. Again, such reformatting is necessary after passing through the program INVERSE TRANSFORM 14 by the reformatting program 16 of FIG. 1. Since such reformatting is obvious to one skilled in this art, no further description of such utility programs is necessary.

Description of Program FF1024P

Program FF1024P (11, FIG. 1) calculates the two-dimensional transforms needed in the processing sequence. The calculation is actually performed by subroutine FF1024 (see below), and program FF1024P merely sets up values for the parameters to be passed to FF1024. Both program FF1024P and FF1024 are written in Fortran IV. The listing of FF1024P is as follows (the integers at the left are simply the line numbers used in the following description):

| | |
|---|---|
| 1 | COMPLEX W(16384) |
| 2 | LUI=1 |
| 3 | LUO=2 |
| 4 | READ (5,100) KEY |
| 5 | 100 FORMAT(I5) |
| 6 | CALL FF1024(KEY,LUI,LUO,W) |
| 7 | STOP |
| 8 | END |

The following statements refer to the program listing above.

Line 1 reserves storage for the array W to be passed to FF1024.

Lines 2 and 3 set values for the input and output file logical unit numbers.

Lines 4 and 5 read a card containing the value of the variable KEY (which determines the direction of the transform, as described below in FF1024).

Line 6 calls FF1024 to perform the computation, and line 7 terminates the program after FF1024 has finished.

Description of Program FF1024

Input parameters passed from the calling program are: KEY—Integer variable which determines the direction of the transform.

If KEY≧0 the forward transform will be computed.

If KEY<0 the inverse transform will be computed.

LU—Logical unit number for the input file.

W—Array to be used as working space in performing the transpose operation.

```
1        SUBROUTINE FF1024(KEY,LU,LUO,W)
2        COMPLEX W(256,64),A(1024),B(256)
3        DIMENSION M(3),INV(256),S(256)
4        DEFINE FILE8(4096,512,U,IPT)
5        LUT=18
6        IKEY=2
7        IF(KEY.LT.O)IKEY=-2
8        REWIND LU
9        REWIND LUO
10       REWIND LUT
11       IPT=1
12       IZ=0
13       M(1)=10
14       M(2)=0
15       M(3)=0
16       CALL HARMGR(A,M,INV,S,IZ,IFERR)
17       DO 40 K=1,4
18       DO 10 I=1,256
19       READ(LU)A
20       CALL HARMGR(A,M,INV,S,IKEY,IFERR)
21       WRITE(LUT)A
22       DO 20 J=1,64
23    20 W(I,J)=A(J)
24    10 CONTINUE
25       DO 30 I=1,64
26       CALL MOVE(1,B,W(1,I),2048)
27       WRITE(8'IPT)B
28    30 CONTINUE
29    40 CONTINUE
30       REWIND LU
31       DO 50 L=1,15
32       REWIND LUT
33       DO 60 K=1,4
34       DO 70 I=1,256
35       READ(LUT)A
36       DO 80 J=1,64
37    80 W(I,J)=A(64*I+J)
38    70 CONTINUE
39       DO 90 I=1,64
40       CALL MOVE(1,B,W(1,I),2048)
41       WRITE(8'IPT)B
42    90 CONTINUE
43    60 CONTINUE
44    50 CONTINUE
45       REWIND LUT
46       DO 110 I=1,16
47       L=256*I-256
48       DO 120 J=1,64
49       IPT=J+L
50       FIND(8'IPT)
51       DO 130 K=1,4
52       READ(8'IPT)B
53       IPT=IPT+63
54       IF(K.NE.4)FIND(8'IPT)
55       CALL MOVE(1,A(256*K-255),B,2048)
56   130 CONTINUE
57       CALL HARMGR(A,M,INV,S,IKEY,IFERR)
58       WRITE(LUO)A
59   120 CONTINUE
60   110 CONTINUE
61       RETURN
62       END
```

The following statements refer to the listing above.

Lines 2 and 3 specify the size and type of various arrays. Arrays W, A, and B are arrays of complex numbers. W is a 256 by 64 array used to transpose blocks of the 1024 by 1024 array of data.

Array A is 1024 complex numbers and is used for several purposes, i.e., as the input array, as the array where the (one-dimensional) transforms are calculated, and as the output array.

Array B is 256 complex numbers and is used as the input/output array to the direct access disk file (logical unit 8) used in the transpose operation.

Arrays M, INV, and S are used in the calculation of the 1024 length (one-dimensional) transforms by subroutine HARMGR. HARMGR is a very minor modification of an IBM application program commercially availabe as HARM. This is described in IBM Manual H20-0205-3, System 360 Scientific Subroutine Package 360A-CM-03X Version III, starting at page 276. The modification consists in the reversal of the sign of parameter IFSET.

Array M contains three integers which specify the size of the transform to be computed by HARMGR. (HARMGR will compute three-dimensional transforms). The dimension of the transform is $$2^{M(1)} \times 2^{M(2)} \times 2^{M(3)}$$

in general. In this case the transform is to be $1024 \times 1 \times 1$, or $2^{10} \times 2^0 \times 2^0$.

Arrays S and INV are used as working space by HARMGR to store tables needed in the computation of the transforms.

Line 4 defines the direct access file used in performing the transpose operation.

Lines 5–11 initialize variables, rewind files, and set IKEY which determines the action of HARMGR.

Lines 12–16 initialize array M, and issue a call to HARMGR with the fifth parameter set to zero to build necessary tables.

Lines 17–29 constitute a loop in which the input data is read trace by trace, the transform of each trace is calculated by HARMGR, the transformed traces are written to a sequential file LUT. At the same time the first 64 points of each transform are moved into successive rows of array W until W is full (256 traces). Then the columns of W are written to the direct (disk) logical unit 8, and control is transferred back to read more input traces, etc.

On completion of this loop all input traces have been transformed and stored on the sequential file LUT. In addition, the first 64 columns of the transpose have been developed in four 257 length segments each by transposing four 64 by 256 point blocks.

Line 30 rewinds the input file in order to release the storage used for "buffers".

Lines 31–44 from a loop in which the transformed traces are repeatedly read from the sequential file (LUT) and successive 64 point segments are moved to array W to be transposed in 64 by 256 blocks, and written to the direct access file, i.e., as already mentioned above (lines 17–29).

Line 45 rewinds the sequential file LUT to release the "buffer" space.

Lines 46 to the end constitute a loop where the four 256 point segments of each column of the transform array are located and read from the direct access file (unit 8). The columns are assembled in array A, transformed and written to the output file LUO.

At line 61, when all the data is processed, the routine returns control to the calling program.

Description of POLYFIL

Program POLYFIL is the main program which applies the polygonal operators to the complex spectrum array. It calls subroutine PLYFIL (see below) to generate and/or apply single polygonal operators. The general method of operation of the program has already been discussed; one can now discuss the program itself.

The listing, again in Fortran IV, is as follows:

```
1           DIMENSION HOR(10),VERT(10)
2           DIMENSION IHOR(10),IVERT(10)
3           DATA IP/'P'/
4           COMPLEX A(1024),B(1024)
5           LUI=1
6           LUT=2
7           LUD=3
8           LUC=4
9           LX=1024
10          READ(5,200,END=999)IMOD,ISYM,ITPRWD
11     200  FORMAT(A1,T1,3X,I5)
12          TPRWD=ITPRWD
13          J=0
14          DO 10 I=1,10
15          READ(5,100,END=20)IHOR(I),IVERT(I)
16     100  FORMAT(2I5)
17          HOR(I)=IHOR(I)
18          VERT(I)=IVERT(I)
19          WRITE(6,300)I,IHOR(I),IVERT(I)
20     300  FORMAT(10X,3I10)
21          J=I
22     10   CONTINUE
23     20   CONTINUE
24          NOPTS=J
25          IF(NOPTS.EQ.0)GO TO 999
26          IOPT=0
27          IF(IMOD.EQ.IP)IOPT=1
28          IF(ISYM.NE.1.AND.IOPT.EQ.1)GO TO 60
29          LUX=LUD
30          IF(ISYM.EQ.1)LUX=LUT
31          CALL PLYFIL(A,LX,HOR,VERT,NOPTS,TPRWD,
32         1 LUI,LUX,IOPT)
33          IF(ISYM.EQ.1)GO TO 998
34          REWIMD LUX
35          DO 30 I=1,NOPTS
36          HOR(I)=HOR(I)
37          VERT(I)=VERT(I)
38     30   CONTINUE
39          CALL PLYFIL(A,LX,HOR,VERT,NOPTS,TPRWD,
40         1 LUX,LUT,IOPT)
41          GO TO 998
42     60   CONTINUE
43          CALL PLYFIL(A,LX,HOR,VERT,NOPTS,TPRWD,
44         1 1,LUD,IOPT)
45          REWIND LUD
46          DO 40 I=1,NOPTS
47          HOR(I)=HOR(I)
48          VERT(I)=VERT(I)
49     40   CONTINUE
50          CALL PLYFIL(A,LX,HOR,VERT,NOPTS,TPRWD,
51         1 1,LUC,IOPT)
52          REWIND LUC
53          DO 70 I=1,1024
54          READ(LUD)A
55          READ(LUC)B
56          DO 80 J=1,1024
57     80   A(J)=A(J)+B(J)
58          READ(LUI)B
59          DO 90 J=1,1024
60     90   A(J)=A(J)*B(J)
61          WRITE(LUT)A
62     70   CONTINUE
63     998  CONTINUE
64          STOP
65     999  CONTINUE
66          STOP 8
67          END
```

The following statements refer to the above listing.

Lines 1, 2, and 4 reserve storage for various arrays needed by the program. The use of these arrays will be described later.

Line 3 initializes the variable IP to contain the four characters 'Pbbb' (b represents a space or blank). The purpose of this will also be described later.

Lines 5–9 initialize the logic unit numbers for the various files needed by the program and sets the variable LX to the value 1024 (the length of the traces in the spectrum array).

Lines 10 and 11 read a card from unit 5 (card reader) which contains information specifying whether the polygon(s) are to be passed or rejected (IMOD), whether a single polygon or two polygons symmetrically located about the origin (in the spectrum) are to be processed (ISYM), and the width of the taper band (ITPRWD) to be used. If no card is found in the reader, the END=999 part of line 10 causes a branch to line 65, which terminates the program in line 6 with a return code of 8 (see manual for the appropriate FORTRAN system).

Line 12 converts the integer ITPRWD to a floating-point number TPRWD (to be passed to PLYFIL), and line 13 initializes the variable J (to be used later) to zero.

Lines 14–22 form a loop in which the coordinates of the vertices are read from cards, printed on the printer, and the number of vertices is determined as described below.

Lines 15–16 read one card containing the horizontal and vertical coordinates of one vertex. Lines 17 and 18 convert the integer values which were read into floating-point values and stores these values for the horizontal and vertical coordinates (of the Ith vertex) in HOR(I) and VERT(I), respectively. The sign of the horizontal coordinate is changed because the particular seismic plotter used (to plot the data) plots from right to left, whereas subroutine PLYFIL treats data as if it went from left to right.

Lines 19–20 write the number of the vertex and the values of its coordinates on logical unit 6 (the printer) to verify to the user that correct data were entered.

Line 21 stores the latest value of I in J so that it will be preserved when the last card is read and line 15 causes a branch to line 23 on the next read attempt. Thus, J will, at line 23, contain the number of vertices. Line 24 stores J in NOPTS (for convenience), and line 25 tests to see if any data were actually input. If not, a branch to line 65 is taken to terminate the program.

Lines 26–27 set the value of IOPT (which indicates whether a pass or reject filter is desired) to 0 for reject or 1 for pass. This is determined by the contents of IMOD (read in line 10), which is compared to IP (which contains 'Pbbb'). If the character 'P' appeared in column 1 of the first input card, IOPT will be set to 1, otherwise it remains 0.

Line 28 is a test to determine if the routine is to pass two symmetrically located polygons, in which case, special processing is required (lines 42–62), as described earlier. Otherwise, processing proceeds in a straightforward manner as follows:

Lines 29–30 set LUX to have the value LUT or LUD, depending on whether one or two polygons are to be processed.

Lines 31-32 call subroutine PLYFIL to process one polygon. If only one polygon is to be processed (ISYM=1) the processing is then complete and line 33 branches to line 63 to terminate the program.

If two polygons are to be processed, lines 34-41 rewind LUX (in this case a temporary file LUD), reverses the signs of the coordinates of the vertices, then calls PLYFIL again to process the second polygon (writing the output on LUT) and branches to line 63 to terminate the program.

Lines 42-62 process the special case of passing two polygons as mentioned above. In this case the input spectrum is not processed by PLYFIL. Instead, the seventh parameter (normally the input logical unit number) is set to −1, which causes PLYFIL to generate an array of complex (1., 0.)'s, i.e., $1+i0$, process it, and write it out. (Here "i" denotes $\sqrt{-1}$.) Lines 43-45 generate and store the operator for the first polygon on LUD and rewind LUD. Then lines 46-52 reverse the signs of the coordinates and call PLYFIL to generate and store the operator for the second polygon on LUC. LUC is then rewound.

Lines 53-62 read the two operators, one trace of each at a time, and add them together point by point. This yields the correct operator to be used to process the spectrum providing that the two polygonal regions (including the taper bands) do not overlap.

Description of Subroutine PLYFIL

Figure 2:
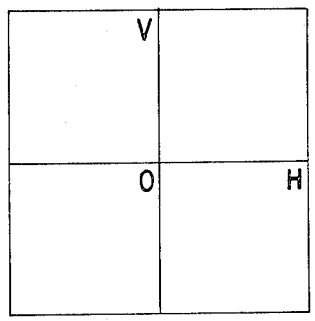
FIGS. 2 and 3 illustrate the geometry associated with the POLYFIL program.
Figure 2:
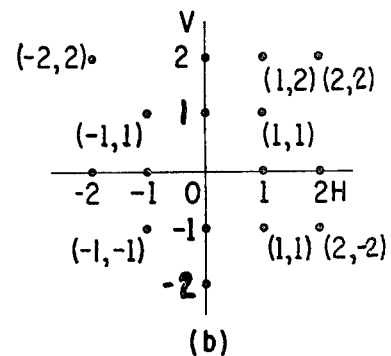
Figure 2:
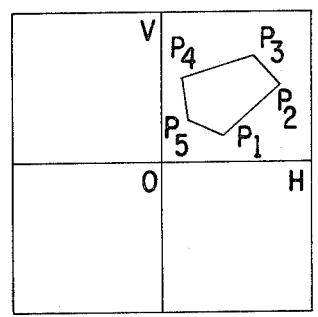
Figure 2:
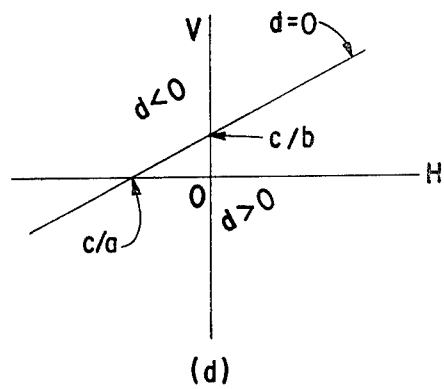

Subroutine PLYFIL actually performs the application of a single polygonal operator. The method it uses follows. Consider the plot of the complex spectrum correctly oriented as shown in FIG. 2(a), i.e., with the zero frequency point in the center. Coordinates (H,V) are assigned to each point in the spectrum, the coordinates (for a seismic section, for example) being respectively the frequency f in the V direction and the wave number k (frequency divided by apparent ground velocity) in the H direction. (This is in accordance with the first three articles given above in the section dealing with prior art). A convenient scale is used in each direction in units of the samples (see FIG. 2(b)).

The polygon selected is specified by the coordinates of its vertices (see FIG. 2(c)) $P_1(h_1,v_1)$, $P_2(h_2,v_2)$, ... $P_n(h_n,v_n)$. (The particular routine, PLYFIL, given below requires the vertices to be specified in cyclic order around the polygon, and that the polygon be strictly convex, i.e. all internal angles be less than 180°).

In applying the polygon operator to the spectrum, one must be able to decide, for any point in the spectrum, whether the point is inside or outside of the polygon. For a given line $ah+bv+c=0$ and any point $(h_1,v_1)$ the formula $$d = \frac{ah_1 + bv_1 + c}{\sqrt{a^2 + b^2}} \quad (1)$$

gives the distances from the point to the line. The sign of d is positive for points on one side of the line and negative for points on the other. (See any elementary analytic geometry text). (Also see FIG. 2(d)).

Rewriting the above formula as $$d = \frac{a}{\sqrt{a^2 + b^2}} h_1 + \frac{b}{\sqrt{a^2 + b^2}} v_1 + \frac{c}{\sqrt{a^2 + b^2}} \quad (2)$$

and letting $$A = \frac{a}{\sqrt{a^2 + b^2}}, B = \frac{b}{\sqrt{a^2 + b^2}}, C = \frac{c}{\sqrt{a^2 + b^2}} \quad (3)$$

one has $$d = Ah_1 + Bv_1 + C. \quad (4)$$

Using this formula one can determine which points are in the polygon by first determining an equation of the form $$a_ih + b_iv + c_i = 0 \quad (5)$$

for the $i^{th}$ side (actually equation (5) represents graphically the line passing through the two adjacent vertices defining the $i^{th}$ side) of the polygon. Then the coefficients $A_i$, $B_i$ and $C_i$ are calculated as in formula (3). The distance $d_i$ from the $i^{th}$ side to any other vertex $P_j(h_j,v_j)$ is then $$d_i = A_ih_j + B_iv_j + C_i. \quad (6)$$

The sign of $d_i$ (either a+ or a−) is recorded for each side, and can be regarded as TEST (I). Precisely those points with coordinates (h,v) which lie inside the polygon will have the property that for every value of i, the number d, where $$d = A_ih + B_iv + C_i \quad (7)$$

will have the same sign as $d_i$. (Moreover, if a point is outside the polygon, the lowest absolute value of d will be the distance from the nearest straight line which in part forms a side of the polygon).

Hence, if no taper band is desired, all that must be done is to determine, for each point in the spectrum, its correct coordinates (h,v), calculate d for each side i, i=1,2, ... n, and compare with the sign of $d_i$. For all values of i, the sign for d and $d_i$ is the same if (h,v) is inside the polygon. If for any i, d and $d_i$ have opposite sign then the point must be outside the polygon.

When coordinates of all points inside the polygon have been determined, the operator can be used to replace by zero the point values within the polygon (if rejection is desired) or vice versa, entirely automatically.

Figure 3:
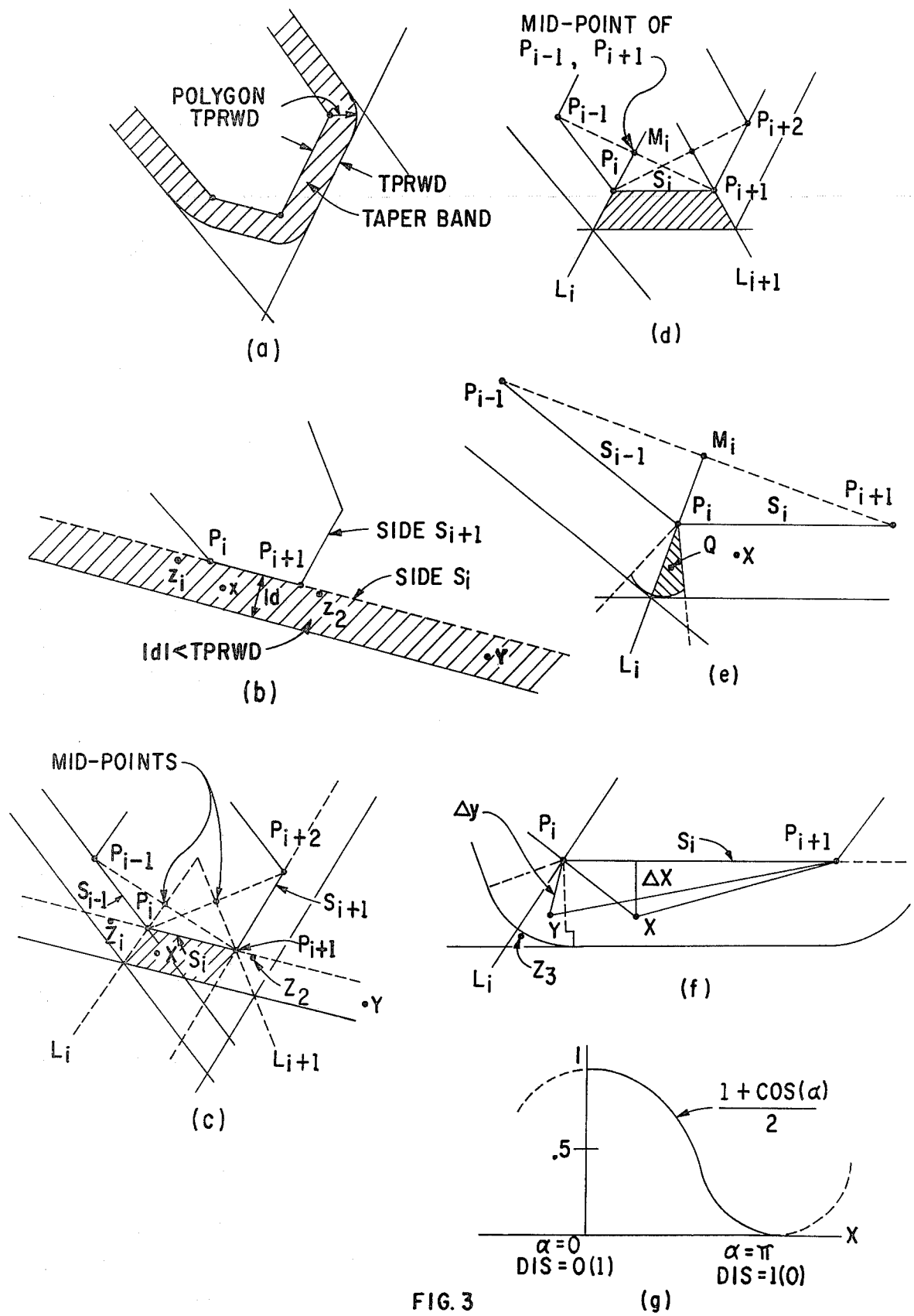

If "tapering" is rejected, additional processing is necessary for points within a band or border outside the polygon. [The taper band is the region consisting of all points whose distance from a side or vertex is less than the specified taper width (see FIG. 3(a)). It is accordingly a border of arbitrary width]. It is necessary to determine if the coordinates of such points lie in the border or taper band and, if so, to calculate a (real) factor between 0, and 1, which is automatically multiplied by the value of the spectral data point. This factor is a function of the distance of the point from the polygon boundary, taking into account the total width of the border.

In order to determine if a point which is outside of the polygon is in the taper band, several tests must be made. First, for the coordinates of a point to be determined to be outside, it must have failed the sign comparison between d and $d_i$ for some i.

The second test is to compare the absolute value of d, i.e., $|d|$ with TPRWD, the width of the border or taper band. If $|d|<$TPRWD, then the point is nearer to the line determined by vertices $P_i$ and $P_{i+1}$ and hence lies somewhere in the strip or border as illustrated in FIG. 3(b).

This alone is not enough to determine what action is to be applied to the value of this point, because there are still three possibilities (assuming $|d|<|d_i|$). These possibilities are exemplified by points X, Y, $Z_1$ and $Z_2$ in FIGS. 3(b) and 3(c).

Point X is within the taper band; the nearest side is side $S_i$; hence, $|d|$ calculated for side $S_i$ yields the correct distance from the polygon to the point. Point Y is actually nearer to side $S_{i+1}$ but lies outside of the taper band. Point $Z_1$ is within the taper band but is nearer side $S_{i-1}$ and hence the value for $|d|$ computed for side $S_i$ is not the right value to use in computing the taper. Note that because the previous tests were made sequentially, this situation can only occur for side 1 so that side n is the previous side. The same remarks apply to point $Z_2$ except that the next side $S_{i+1}$ is the nearest side.

In order to separate these cases, the taper band is divided into sections by the lines $L_i$ through vertex $P_i$ and the midpoint $M_i$ of the line segment between vertices $P_{i-1}$ and $P_{i+1}$. The section of the taper band associated with side $S_1$ is illustrated in FIGS. 3(c) and 3(d).

Using the same technique as before (except the actual distance is not needed here, only the sign) to determine which side of a line a point is on, the points in the section adjacent to side $S_i$ can be determined. If a point is not in this section, it must be tested in either the previous section (only when $i=1$) or the next $(i+1^{st})$ section. If $|d|$ is greater than TPRWD, the point is outside the taper band (e.g., point Y in FIG. 3(c)). Otherwise, the point is in the taper band and is in the section associated with side $i+1$ (or perhaps the last side in the exceptional case, $i=1$).

If a point has been determined to be in the taper band and in the section associated with side $S_i$, the only remaining test is to determine whether the distance from the side is to be used to compute the taper, or if the distance to a vertex should be used in order to "round the corners" of the taper band. These two cases are exemplified by points X and Y, respectively (see FIGS. 3(e) and 3(f)). This is easily determined by calculating the distances from the point to the vertices $P_i$ and $P_{i+1}$. If either of these distances is greater than the length of side $S_i$ the point is in the "corner" and the distance to be used is the shortest of the two distances to $P_i$ and $P_{1+1}$. Otherwise, the distance $|d|$ (previously calculated) is used for $\Delta$ (see FIG. 3(f)) which in this case would be $\Delta X$.

Now that $\Delta$ is determined, the ratio of $\Delta$ to TPRWD is calculated. If it is greater than 1, the point is outside the band; otherwise it is multiplied by $\pi$ and the product obtained is used as the argument in a half cycle of the function $1+\cos(\alpha)/2$ to determine the taper factor to be applied to the spectral value (see FIG. 3(g)). Here $\alpha$ is:

$$\alpha = \Delta\pi/\text{TPRWD}.$$

In the program, as will be seen below, the ratio $\Delta$/TPRWD is termed DIS.

Description of Program PLYFIL

Input parameters:

X—Complex array of length LX (see below) used to hold traces of the spectrum.
LX—Length of spectrum traces.
HOR—Array containing the horizontal coordinates of the vertices of the desired polygon.
VERT—Array containing the vertical coordinates of same.
TPRWD—Width of the taper region around the outside of the polygon.
LUI—Logical unit number of the input file (except if LUI$\leq$0, the routine internally generates traces of complex (1., 0.)'s, i.e., 1.+0.i, and then processes these traces instead of reading an input spectrum. This produces the filter operator on the output file LUO).
LUO—Logical unit number of the output file.
IOPT—Determines if polygon is to be passed or rejected. If IOPT=0, points inside the polygon and on the boundary are zeroed and points outside, except those in the taper band, are unaffected. If IOPT=1, points inside and on the boundary are unaffected, and points outside, except those in the taper band, are zeroed.

```
1       SUBROUTINE PLYFIL(X,LX,HOR,VERT,
        NOPTS,
2      1 TPRWD,LUI,LUO,IOPT)
3       COMPLEX X(LX)
4       DIMENSION HOR(1),VERT(1),H(12),V(12)
5       DIMENSION DSQ(11),TEST(10),A(10),B(10)
6       DIMENSION C(10),BTEST(10),HB(10),VB(10)
7       DIMENSION AB(10),BB(10),CB(10)
8       EQUIVALENCE (AB(1),HB(1)),(BB(1),VB(1))
9       DISSQR(H1,V1,H2,V2,)=(H1-H2)*(H1-H2)+
10      1(V1-V2)*(V1-V2)
11      PI=3.1415926536
12      IPT = 0
13      IF(TPRWD.LT.O.)GO TO 999
14      IF (IOPT.LT.O.OR.IOPT.GT.1) GO TO 999
15      IF (NOPTS.LT.O.OR.NOPTS.GT.10) GO TO 999
16      REWIND LUO
17      IF (LUI.GT.O.) REWIND LUI
18      DO 10 II=1,NOPTS
19      H(II) = HOR(II)
20      V(II) = VERT(II)
21   10 CONTINUE
22      V(NOPTS+1) = V(1)
23      H(NOPTS+1) = H(1)
24      V(NOPTS+2) = V(2)
25      H(NOPTS+2) = H(2)
26      DO 15 II=1,NOPTS
27      III=II+1
28      DSQ(II)=DISSQR(H(II),V(II),H(III),V(III))
29   15 CONTINUE
30      DSQ(NOPTS+1)=DSQ(1)
31    1 CONTINUE
32      IPT = IPT+1
33      IF (H(IPT).NE.H(IPT+1)) GO TO 2
34      A(IPT = 1.0
35      B(IPT) = 0.0
36      C(IPT) = H(IPT)
37      GO TO 3
38    2 CONTINUE
39      IP1=IPT + 1
40      A(IPT) = (V(IP1)V(IPT))/(H(IP1)H(IPT))
41      B(IPT) = 1.
42      C(IPT) = V(IPT)A(IPT)*H(IPT)
43      DIVSR=SORT(A(IPT)*A(IPT)+1.)
44      A(IPT)=A(IPT)/DIVSR
45      B(IPT)=B(IPT)/DIVSR
46      C(IPT)=C(IPT)/DIVSR
47    3 CONTINUE
48      IP2=IPT+2
49      TEMP = A(IPT)*H(IP2)+B(IPT)*V(IP2)+C(IPT)
50      IF (TEMP.EQ.O.) GO TO 999
51      TEST(IPT) = SIGN(1.0,TEMP)
52      IF (IPT.LT.NOPTS) GO TO 1
53      IF(TPRWD.EQ.O.)GO TO 8
54      DO 4 I=2,NOPTS
55      HB(I)=(H(I1)+H(I+1))/2
56      VB(I)=(V(I1)+V(I+1))/2
57    4 CONTINUE
58      HB(1)=(H(2)+H(NOPTS))/2
59      VB(1)=(V(2)+V(NOPTS))/2
```

```
60        I=0
61    5 CONTINUE
62        I=I+1
63        IF(HB(I).NE.H(I))GO TO 6
64        AB(I)=1.
65        BB(I)=0.
66        CB(I)=H(I)
67        GO TO 7
68    6 CONTINUE
69        AB(I)=(V(I)VB(I))/(H(I)HB(I))
70        BB(I)=1.
71        CB(I)=V(I)AB(I)* H(I)
72    7 CONTINUE
73        TEMP=AB(I)*H(I+1)+BB(I)*V(I+1)+CB(I)
74        IF(TEMP.EQ.0.)GO TO 999
75        BTEST(I)=SIGN(1.,TEMP)
76        IF(I.LT.NOPTS)GO TO 5
77    8 CONTINUE
78        LLX = LX/2
79        LX1 = 1+LX
80        JB = 1
81        DO 90 J=1,LX
82        IF (LUI.GT.0) GO TO 25
83        DO 35 K=1,LX
84        X(K) = (1.,0.)
85   35 CONTINUE
86        GO TO 45
87   25 CONTINUE
88        READ (LUI) X
89   45 CONTINUE
90        IF (J.GT.LLX) JB = LX1
91        IC = 1
92        VX = JB-J
93        DO 80 I=1,LX
94        IF (I.GT.LLX) IC=LX1
95        HX = I-IC
96        IPT=0
97        KEY=1
98   30 CONTINUE
99        IPT=IPT+KEY
100       IF(IPT.LT.0)GO TO 999
101       TEMP=A(IPT)*HX+B(IPT)*VX+C(IPT)
102       TEMP=TEMP*TEST(IPT)
103       IF (TEMP.LT.0.)GO TO 39
104       IF (IPT.LT.NOPTS)GO TO 30
105       IF (IOPT.EQ.0.) X(I) = (0.,0.)
106       GO TO 50
107  39 CONTINUE
108       IF(TPRWD.EQ.0.)GO TO 40
109       JPT=IPT+1
110       IF(KEY.EQ.-1)JPT=IPT
111       DIST=ABS(TEMP)
112       IF(DIST.GT.TPRWD)GO TO 40
113       IF (JPT.GT.NOPTS)GO TO 31
114       TEMP=AB(JPT)*HX+BB(JPT)*VX+CB(JPT)
115       TEMP=TEMP*BTEST(JPT)
116       IF(KEY.EQ.-1)GO TO 32
117       IF(TEMP.GT.0.)GO TO 30
118       IF(IPT.NE.1)GO TO 31
119       KEY=-1
120       IPT=NOPTS+1
121       Temp=AB(1)*HX+BB(1)*VX+CB(1)
122       TEMP=TEMP*BTEST(1)
123  32 CONTINUE
124       IF(TEMP.LT.0.)GO TO 30
125  31 CONTINUE
126       DIS=DISSQR(H(IPT),V(IPT),HX,VX)
127       DNEXTS=DISSQR(H(IPT+1),V(IPT+1),HX,VX)
128       DMINS=AMIN1(DIS,DNEXTS)
129       DMAXS=AMAX1(DIS,DNEXTS)
130       HYPS=DMINS+DSQ(IPT)
131       IF(HYPS.LT.DMAS)DIST=SQRT(DMINS)
132       DIS=DIST/TPRWD
133       IF(DIS.GE.1.)GO TO 40
134       FF =(1.+COS(PI*DIS) )/2.
135       IF(IOPT.EQ.0)FF=1.-FF
136       X(IF)=FF*X(I)
137       GO TO 50
138  40 CONTINUE
139       IF(OPT.EQ.1) X(I) = (0.,0.)
140  50 CONTINUE
141  80 CONTINUE
142       WRITE (LUO) X
143  90 CONTINUE
144       RETURN
145 999 CONTINUE
146       STOP
147       END
```

Lines 3-7 reserve storage for various arrays. (The use of these arrays will be explained below). Line 8 requests that AB and HB share the same storage locations in memory. The same is true for BB and VB.

Lines 9-10 define a "statement function" DISSQR, which computes the square of the distance between points (H1, V1) and (H2, V2).

Lines 11-15 initialize PI to have the value $\pi$ (3.14159265), and set IPT (which will be used to index the vertices later) to 0. The parameters TPRWD, IOPT, and NOPTS are then tested for valid values.

Lines 16 and 17 rewind the input (LUI) and output (LUO) files. (If LUI$\leq$0, it is not rewound. See description of LUI above.

Lines 18-25 copy the coordinates of the vertices from the arrays HOR and VERT into arrays H and V, respectively. The first and second elements are also placed after the last vertex for convenience in computation later.

Lines 26-30 calculate the squares of the lengths of the sides of the polygon and stores these values in array DSQ. The first element is also placed after the last one.

Lines 31-52 form a loop which is executed once for each vertex. In this loop the coefficients A, B, and C, described earlier, are generated to be used in calculating the signed distance from a point to the line through two adjacent vertices, as described earlier. IPT is used as the index in this loop. (Side IPT is associated with vertices IPT and IPT+1). The coefficients are calculated using the "slope-intercept" form for the equation of a line (in lines 38-42) unless the slope is vertical (as tested for in line 33), in which case, lines 34-36 are used. Then, a, b, and c are divided by $\sqrt{a^2+b^2}$ in lines 43-46.

Lines 48-51 calculate the signed distance (TEMP) from the line through vertices IPT and IPT+1 to vertex IPT+2. The sign of this value is stored (as $\pm 1$.) in location IPT of array TEST. If the value of TEMP is zero for any vertex, then that vertex is on the line through the two previous vertices and the polygon is not "strictly" convex, which is required for correct calculation. Line 50 makes this test and terminates the program if TEMP is zero.

Line 52 determines if all vertices have been processed and either branches back for the next vertex or lets control pass out of the loop.

Line 53 tests to see if tapering is desired, and, if not, (TPRWD=0) branches around the unneeded computations.

Lines 54-59 calculate, for the Ith vertex, the midpoint of the line segment between vertices I−1 and I+1, and stores the coordinates in HB(I) and VI(I).

Lines 61-76 calculate, for each value of I, the coefficients (AB, BB, and CB arrays) to be used to determine on which side of the line through the Ith vertex and the midpoint between the I−1st and the I+1st vertices an arbitrary point lies. This computation is similar to that in lines 31-52 above. The sign associated with the I+1st vertex, using the coefficients for the line through the Ith vertex, is stored in BTEST(I).

Lines 78–80 initialize the variables LLX, LX1 and JB, which will be used in computing corrected coordinates of the points in the spectrum.

Lines 81–143 constitute the main processing loop. In lines 82–89 a trace of the spectrum is read, unless LUI≦0, in which case a trace of complex (1., 0.)'s is generated internally.

Lines 90–92 calculate the corrected vertical coordinate (VK) for the points in the current trace.

Lines 93–141 form a loop in which one trace of the spectrum is processed point by point. For each spectral point the following sequence of computations is made: First, in lines 94–95 the corrected horizontal coordinate (HX) is calculated. Next, the correct coordinates are tested in lines 98–104, using the coefficients stored in A, B, and C, to determine if the point is inside of the polygon. If the signed distance calculated for each set of coefficients agrees in sign with the corresponding entry in TEST stored previously, for every side, the point is inside of the polygon. Control then reaches line 105, which either does nothing to the value of this spectral point if IOPT is not zero (pass-type filter), or sets the value to (complex) zero if IOPT is zero (reject-type filter). Then, via lines 106 and 140, control reaches line 141, where a branch back to line 93 occurs if there are any points in this trace that have not been processed, or, if this was the last point in this trace, control passes to line 142 and the processed trace is written to the output file LUO. Line 143 then either branches back to line 81 to process the next trace, or, if this was the last trace, control passes to line 144, where control is returned to the calling program.

If, at line 103, the spectral point currently being processed lies outside of the polygon, the value of TEMP will be negative (for the first time) for some value of the index IPT. Control then passes to line 107, which is the start of the coding to process points which are outside of the polygon.

If no tapering is desired, TPRWD will be 0. and line 108 will branch to line 138, where in line 139 the point is either zeroed or left unaltered (depending on IOPT) and control reaches line 140, where the action is as described earlier for the case where the point was inside of the polygon.

If tapering is desired, then TPRWD will not be zero, and line 108 will allow control to pass to line 109. Lines 109–137 determine whether the point is in the taper band and, if so, calculate a taper factor between 0. and 1. and multiply the (complex) value of the point by this factor, as described below.

At line 109, IPT is the index corresponding to the first time the spectral point was found to be on the side opposite to the polygon of a line determined by adjacent vertices (the extension of a side of the polygon).

If the distance from the line (DIST in line 111) is greater than the width of the taper band (TPRWD), then the point is outside the taper band and line 112 branches to line 138, where "outside" points are processed, as described previously.

If, at line 112, DIST is less than TPRWD, the point may or may not be in the taper band. (The possibilities are indicated by points X, Y, $Z_1$, and $Z_2$ in FIG. 3(b).) In order to separate these cases the taper band is divided into sections separated by lines through the vertices, as described earlier and illustrated by FIG. 3(c). Point X is in the section associated with side $S_i$ (i in FIG. 3(c) is the same as IPT here). Point $Z_1$ is in the previous (IPT−1) section. Points $Z_2$ and Y are in the next (IPT+1) section. $Z_2$ is in the taper band, but Y is too far away from the polygon.

Two cases need to be considered here because of the possibility illustrated by point $Z_1$. A point can only be in position $Z_1$ if IPT=1, because for IPT>1, then the point was tested for side IPT−1 and found not to be "outside". When IPT=1, side NOPTS is the "previous" side and the point has not yet been tested relative to this side. In this case, the routine tests to see if the point is associated with sections 1 and 2, and if not, it changes the sign of the variable KEY used to increment IPT and "backs up" to side NOPT.

A similar situation occurs if IPT=NOPTS (the last side). In this case the next side is side 1, which has already been tested so neither of the possibilities exemplified by points $Z_1$ and $Z_2$ can occur.

Returning to the description of the program statements, KEY was initialized to be +1 in line 97. In lines 109 and 110 JPT is set to be the index of the "next" side. Then, if at line 112, DIST is less than TPRWD, JPT is tested to see if its is greater than NOPTS. This only occurs when IPT=NOPTS and thus represents the third exceptional case described above. Hence, the point must be associated with section IPT(=NOPTS) and no further testing is necessary, so a branch is made to line 125 for final processing of the point (see below). If at line 113 JPT is less than or equal to NOPTS, then lines 114 and 115 and 117 test to see if the point is in the next section. It, at line 117, TEMP is greater than 0, the spectral point belongs in section IPT+1, and control is sent back to line 98 where IPT is incremented and the distance (TEMP) calculated and its sign compared with TEST. This time TEMP must be less than zero since the point is known to be outside by previous test; hence, line 103 will branch to line 107. Lines 108–110 do as before and lines 111 and 112 determine if the point is within TPRWD in this section (to which it must belong). If DIST>TPRWD, the point is "outside" (point Y in FIG. 39b) and a branch to line 138 is taken, and appropriate action is taken as previously described. If DIST≧TPRWD, lines 114, 115, and 117 will be executed and line 117 will allow control to reach 118.

Line 118 tests for the other exceptional case (IPT=1) and if IPT is not 1 (it will not be), branches to line 125 for final processing.

The statements (lines 100, 110, 116, etc.), which were not mentioned above, are involved in the exceptional case IPT=1, where the point is in section NOPTS. In this case, at line 117 TEMP will not be greater than zero and line 118 will let control pass to lines 119–124 which set KEY to −1, IPT to NOPTS+1 (so that when IPT is incremented by KEY it will have the value NOPTS). Lines 121, 122, and 124 test to see if the point is in section 1 and, if not, line 124 causes a branch back to line 98. Line 99 then sets IPT to have the value NOPTS.

Lines 101–103 again calculate TEMP (which must be negative) and, hence, line 103 will branch to line 107. At line 112, if the point is within the distance TPRWD of the polygon, control will pass to lines 113–116, where a branch is taken to line 123. At line 124 TEMP (as computed in lines 114–115) will be positive and control will proceed to line 126.

If a point was found to be in the taper band (before rounding the corners) in section IPT, lines 126–132 determine whether the nearest point of the polygon is a vertex or not. This is done by comparing the distances from the spectral point to the vertices IPT and IPT+1 with the length of the side of the polygon between vertices IPT and IPT+1. If either distance is greater than the length of the side, then the distance of the nearest vertex is used (line 131). Otherwise, the distance (DIST) from the side (previously computed in line 111) is used (see FIG. 3(f)).

The distance DIST thus calculated is then divided by TPRWD and the ratio is stored in DIS. Hence, points in the desired taper band will have values of DIS between 0. and 1. It is possible at this location in the program for DIS to be greater than 1. for some points because the corners of the taper band have not been "rounded" yet (see point Z in FIG. 3(f)). Line 133 detects these points and branches to line 138, where points outside are treated. Hence, at line 134 the corners have been "rounded" and lines 135–136 calculate a "cosine taper" factor FF and apply it to the value of the spectral point. A branch is then made to line 140 and at line 141 the program takes the action described previously, depending on whether there are any points left to be processed.

Description of Program PLOTKK

Program PLOTKK (12, FIG. 1) plots the amplitude of the data as already transformed by the fast discrete Fourier transform program (11, FIG. 1). The listing of the PLOTKK program in FORTRAN IV is as follows:

```
1       LOGICAL*1 ITITLE(35), IPTY,BL/' '/
2       INTEGER JMOD/'LOG'/, KMOD/'LIN'/
3       REAL*4 BIG/ Z7FFFFFFF/
4       COMPLEX A(1024)
5       DIMENSION R(1024),S(1024),SS(1048)
6       EQUIVALENCE(R(1),A(1)),(S(1),SS(13))
7       LA=1024
8       READ(9,100)IMOD,IMAX,IMIN,ITITLE,IPTY
9   100 FORMAT(A4,2I3,35A1,34X,A1)
10      ITITLE(34)=BL
11      ITITLE(35)=BL
12      IF(IMOD.NE.JMOD)IMOD=KMOD
13      IF(IMIN.LT.IMAX)GO TO 40
14      IMIN=30
15      IMAX=0
16  40  CONTINUE
17      WRITE (5,200)IMOD,IMAX,IMIN,ITITLE,IPTY
18  200 FORMAT ('PLOT AMP SPEC',A4,2I4,1X,35A1,
19      1 'VD 48',11X, '1',A1)
20      REWIND 5
21      DO 5 I=1,1048
22      SS(I)=BIG
23  5   CONTINUE
24      DO 7 I=1,12
25      IF(I.EQ.4)SS(524)=BIG
26      IF(I.EQ.10)SS(524)=BIG
27      WRITE (3)SS
28  7   CONTINUE
29      RMAX=0.
30      DO 10 I=1,1024
31      READ(1)A
32      DO 20 J=1,1024
33      R(J)=CABS(A(J))
34      IF(R(J).GT.RMAX)RMAX=R(J)
35  20  CONTINUE
36      IF(IMOD.NE.JMOD)GO TO 24
37      DO 21 J=1,1024
38      IF(R(J).NE.O.)GO TO 22
39      R(J)=80.
40      GO TO 21
41  22  R(J)=ALOG10(R(J))
42  21  CONTINUE
43  24  CONTINUE
44      DO 30 K=1,512
45      S(K)=R(513K)
46      S(K+512)=R(1025K)
47  30  CONTINUE
48      IF(I.LE.512)WRITE(4)SS
49      IF(I.GT.512)WRITE(3)SS
50  10  CONTINUE
51      REWIND 4
52      DO 15 I=1,512
53      READ(4)SS
54      IF(I.NE.1)GO TO 14
55      DO 13 K=1,6
56      SS(K+3)=BIG
57      SS(1046K)=BIG
58  13  CONTINUE
59  14  CONTINUE
60      WRITE(3)SS
61  15  CONTINUE
62      DO 9 I=1,1048
63      SS(I)=BIG
64  9   CONTINUE
65      DO 8 I=1,12
66      IF(I.EQ.4)SS(524)=BIG
67      IF(I.EQ.10)SS(524)=BIG
68      WRITE(3)SS
69  8   CONTINUE
70      REWIND 3
71      REWIND 4
72      DMIN=FLOAT(MIN)/20.
73      DMAX=FLOAT(IMAX)/20.
74      IF(IMOD.NE.JMOD)GO TO 50
75      RMAX=ALOG10(RMAX)
76      AMAX=RMAX+DMAX
77      AMIN=RMAX+DMIN
78      GO TO 60
79  50  CONTINUE
80      AMAX=RMAX*10.**DMAX
81      AMIN=RMAX*10.**DMIN
82  60  CONTINUE
83      CALL SDAMPM(3,7,1048,1048,AMIN,AMAX,40,
84      1 110,4,SS)
85      STOP
86      END
```

The following statements refer to this program listing:

Lines 1–6 define storage needed by the program and initialize some of the variables.

ITITLE is an array to hold a 35-character title for the plot (only the first 33 characters will be used, however). IPTY holds a single character used to supply priority information for plotting at a data processing center. BL is a single character initialized to be a blank (or "space") character. JMOD and KMOD are integer variables used to hold four characters each and initialized to 'LOG¢' and 'LIN¢' respectively (¢ represents a blank space). BIG is a floating point variable initialized to be the maximum positive number that it is possible to represent in single precision floating point format. (Again, this will vary from one computing system to another). A is a complex array of 1024 numbers used to hold the trace of the complex spectrum. R, S, and SS are arrays used to hold amplitude values as described below.

Line 7 initializes LA to be 1024 (the length of the spectrum traces).

Lines 8–9 read a card from unit 9 (the card reader for this program) containing information about the plotting parameters.

IMOD will contain the characters from columns 1–4 of the card and will be compared later to JMOD and KMOD to determine whether the grey scale of the variable density plot is to be a linear or logarithmic representation of the amplitude values.

IMAX and IMIN are integers (from columns 5–7 and 8–10) which determine the black and white levels (in db) on the plot relative to the maximum amplitude value in the spectrum.

ITITLE receives the characters from columns 11–45 of the card, and IPTY receives the character in column 80.

Lines 10-11 replace the last two characters of ITITLE with blanks.

Line 12 tests IMOD to see if it contains the characters 'LOGb', and if not, sets IMOD to 'LINb'.

Line 13 tests to see if the values for IMAX and IMIN are reasonable. If not (or if those columns of the card were left blank, which would result in zero values), lines 14 and 15 supply "default" values of IMAX=0 and IMIN=−30 (db).

Lines 17-19 write the information in line 7 to a temporary disk (unit 5) which will be read by the plot routine called by SDAMPM. This supplies part of the information needed to determine the plotting parameters. Line 20 then rewinds unit 5.

Lines 21-27 generate 12 output traces on unit 3 (a temporary disk file) containing the maximum positive number (except for the 524th value on traces 4 through 9). These 12 traces will form the black border at the top of the plot with a white "tick mark" in the center position.

Lines 30-50 form a loop in which the complex spectrum traces are read, one at a time, into array A. Then the amplitudes of the complex values are calculated and stored in array R in line 33. At the same time the maximum amplitude value in the spectrum is searched for, using RMAX to hold the result.

Next, if a logarithmically scaled plot is desired (IMOD='LOGb'), lines 37-42 replace the nonzero amplitude values in R by their logarithms (base 10) and replace zero values by −80 (which will be smaller than the logarithm of the smallest positive floating point number for this computer).

Lines 44-47 reverse the first half (512 points) of each trace in line 45 and then reverse the second half in line 46. (This is part of the manipulation required to produce a correctly oriented plot).

Lines 48-49 write the first 512 traces (with 24 samples before and after the data in each trace having the value BIG) to logical unit 4 and the last 512 traces to logical unit 3. (This is so that the last 512 traces can be put before the first 512, which is another part of the manipulation required to produce a correctly oriented plot).

Lines 52-61 constitute a loop in which the first 512 traces are copied from logical unit 4 to logical unit 3 (hence following the last 512 traces on unit 3).

Lines 54-58 operate on the first trace (now the 513th) replacing the fourth through ninth points and the 1040th through 1045th with −BIG which will plot as a white "tick mark" in the black border to assist in locating the origin. Then lines 62-69 generate and write to logical unit 3 an array of BIG values (as in lines 21-28 above) to make the bottom of the black border.

Lines 70-71 rewind into 3 and 4 (4 is no longer needed).

Lines 72-73 calculate the values DMIN and DMAX which are the logarithms of the amplitude ratios corresponding to IMIN and IMAX for a linear plot (from the definition of the decibel as an amplitude ratio, dB=20 log $A_1/A_2$). So log $A_1/A_2$=dB/20.).

Line 74 again tests for a linear or logarithmic plot, and if it is to be linear, lines 79-81 calculate the black and white levels AMAX and AMIN by multiplying RMAX (largest value in the amplitude spectrum) by the requested amplitude ratios.

$$AMAX = RMAX(10^{DMAX}) = RMAX(10^{\log \frac{A_1}{A_2}}) =$$

$$RMAX \cdot \frac{A_1}{A_2}, \text{ etc.}$$

If the plot is to be logarithmic (in grey level), lines 75-77 are executed to compute the logarithm of RMAX and add the logarithms of the desired ratios. (IMAX and IMIN were specified in db relative to RMAX).

Finally, the amplitude data stored in logical unit 3 (including the numbers required to generate a black border) are processed by subroutine SDAMPM which reads the data on logical unit 3 and writes a tape in a format acceptable to the plotting equipment.

SDAMPM is a utility plotting routine which reads the data, scales it linearly to numbers acceptable to a seismic-type plotter, and writes the plot tape. This subroutine is discussed below.

Parameters for SDAMPM are as follows (in this case):

| Parameter Number | Value | Purpose |
|---|---|---|
| 1 | 3 | input unit |
| 2 | 7 | output unit for plot tape |
| 3 | 1048 | number of traces |
| 4 | 1048 | length of a trace |
| 5 | (AMIN) | values in input data to be |
| 6 | (AMAX) | linearly converted to the values of the 7th and 8th parameters respectively |
| 7 | −40 | values on output tape |
| 8 | 110 | acceptable to plotter and representing white and black levels respectively |
| 9 | 4 | value which specifies that the data is to be plotted at 50 samples per inch |
| 10 | SS | array for working space |

Other information is provided by the card image on unit 5 which was written in lines 17-19. All information up to 'VD 48' in the care image is used for a title. 'VD 48' specifies that a variable density (grey level) plot with 48 traces per inch is to be generated.

The last character (in col. 80) of the card image is IPTY which is a plotting priority as described above.

Description of Subroutine SDAMPM

This subroutine reads data from an unformatted tape, scales the data, and writes a plot tape. One file at a time is scaled and passed to the subroutine DRPLOT which prepares the file for passing to subroutine PLTTCC which writes a plot tape. The statements are in Fortran IV.

```
1    SUBROUTINE SDAMPM(LUIN,LUOUT,MMAX,NMAX,
2    1AMIN, AMAX,IPLTRL,IPLTRH,MSPS,DATA)
3    DIMENSION DATA (NMAX)
4    INTEGER*2 ITR(6024), IPL, IPH
5    PLTRL=IPLTRL
6    PLTRH=IPLTRH
7    IPL=IPLTRL
8    IPH=IPLTRH
9    A=(PLTRH - PLTRYL)/(AMAX - AMIN)
10   B=(AMAX*PLTRYL) - (PLTRH*AMIN))/(AMAX - 1AMIN)
11   
12   DO 6 I=1, MMAX
13   READ (LUIN) DATA
14   DO 3 J=1,NMAX
15   JJ=J + 24
16   IF (DATA(J).LE.AMIN) GO TO 1
```

|     | -continued |
| --- | --- |
| 17 | IF (DATA(J).GE.AMAX) GO TO 2 |
| 18 | ITR(JJ)=(A*(DATA(J))) + B |
| 19 | GO TO 3 |
| 20 | 1 ITR(JJ)=IPL |
| 21 | GO TO 3 |
| 22 | 2 ITR(JJ)=IPH |
| 23 | 3 CONTINUE |
| 24 | 6 CALL DRPLOT)I,NMAX,ITR,LUOUT,O,MSPS, |
| 25 | 1MMAX) |
| 26 | RETURN |
| 27 | END |

The following statements refer to this program listing:

LUIN—An integer value assigning a logical unit for the input file.
LUOUT—An integer value assigning a logical unit for the output file.
MMAX—An integer value setting the number of files to be input to the subroutine.
NMAX—An integer value setting the number of values per input file.
AMIN—A floating point value setting the mimimum value of the input file.
AMAX—A floating point value setting the maximum value of the input file.
IPLTRL—An integer value setting the desired mimimum value to which the input file will be scaled.
IPLTRH—An integer value setting the desired maximum value to which the input file will be scaled.
MSPS—The number of milliseconds per sample.
DATA—An array used to store the input file.
Line 3—Allocation of storage for the input file.
Line 4—ITR is an integer 2 array used to reserve storage for the scaled input file to be output to subroutine DRPLOT.
Lines 5-8 initialize values used to scale input file.
Lines 9-11 calculated the coefficients a and b in the linear equation y=ax+b used to scale the input file.
Lines 12-25 form a loop which reads an input file, determines if the values of the input file are within the maximum and minimum described for the input file, then scale the values using the linear equation y=ax+b. The scaled input file is stored in array ITR which is passed to subroutine DRPLOT. The subroutine DRPLOT called on line 24 is given below in Fortran IV.

Description of Subroutine DRPLOT

The purpose of this subroutine is to prepare a file passed from it from SDAMPM for input to subroutine PLTTCC which writes a plot tape.

|     |     |
| --- | --- |
| 1 | SUBROUTINE DRPLOT(II,NS,ITR,LU,INORM,MSI, |
| 2 | 1MNTR) |
| 3 | INTEGER:4 TITLE(21) |
| 4 | INTEGER*2 ITR(1), IT(1524) |
| 5 | IF(II.GT.1) GO TO 7 |
| 6 | READ (5,1) (TITLE(N), N = 1,20) |
| 7 | 1 FORMAT(20A49 |
| 8 | WRITE(6,9) (TITLE(N),N=1,20) |
| 9 | 9 FORMAT(1H1,20A4) |
| 10 | DO 5 −1,1524 |
| 11 | 5 IT(I)=0 |
| 12 | IT(10)=NS |
| 13 | IT(11)=MSI |
| 14 | CALL PLTTCC(IT,LU,TITLE,O,INORM,IT(25) |
| 15 | DO 6 =1,24 |
| 16 | 6 ITR(I)=0 |
| 17 | ITR(1)=99 |

|     | -continued |
| --- | --- |
| 18 | ITR(2)=1 |
| 19 | ITR(10)=NS |
| 20 | ITR(11)=MSI |
| 21 | ITR(12)=MNTR |
| 22 | ITR(16)=I |
| 23 | 7 ITR(3)=II |
| 24 | CALL PLTTCC(ITR,LU,TITLE,O,INORM,ITR(25) |
| 25 | IF (II.EQ.MNTR) GO TO 8 |
| 26 | RETURN |
| 27 | 8 CALL PLTTCC(IT,LU,TITLE,1,INORM,IT(25) |
| 28 | RETURN |
| 29 | END |

The following statements refer to this program listing: The arguments for DRPLOT are:

II—An integer value of the number of the current file being read.
NS—An integer value setting the number of samples per file.
ITR—An integer array used to store the input file.
LU—An integer value assigning a logical unit for the output file from subroutine PLTTCC.
INORM—An integer value which if set equal to one (1), the input file will be scaled between the values +127 and −127 in the subroutine PLTTCC. If set equal to zero (0), the file will be scaled in this subroutine DRPLOT prior to passing it to subroutine PLTTCC.
MSI—An integer value describing the sample interval in milliseconds.
MNTR—An integer value setting the number of the last file to be written.
Line 3 allocates storage for label information required by subroutine PLTTCC.
Line 4 allocates storage for files used as input and later as output to subroutine PLTTCC.
Line 5—If this is the first files to be processed, then the label information must be read and the output file initialized.
Lines 6-9 read an 80 byte card image containing label information and plot parameters, necessary for subroutine PLTTCC.
Lines 10-11 form a DO loop which initializes the array IT to zero.
Lines 12-13 initialize two values of the IT array describing the number of samples in the file and the sample interval in milliseconds.
Line 14 calls subroutine PLTTCC which generates the plot tape. (Same on Line 26).
Lines 15-16 form a DO loop to initialize the first 24 values of array ITR.
Lines 17-23 initialize values in the input file to be passed to subroutine PLTTCC.
Line 24—Same as Line 14.
Line 25 checks to see if the last file has been processed.
Lines 26-27 call subroutine PLTTCC if the last file has been processed.

Description of Subroutine PLTTCC

This subroutine writes a 9-track plot tape. It is in Fortran IV, (requires the IBM "H" compiler).

|     |     |
| --- | --- |
| 1 | SUBROUTINE |
| 2 | PLTTCC)ITR,LUPLT,TITLE,ICLOSE, 1NORM,KTR) |
| 3 | INTEGER*4 IPESOS(45), KTEST(1) |
| 4 | INTEGER * 2 ITRHED(24), JTEST(2), |
| 5 | 1TRAIL(29), ITI |

```
-continued
  6    INTEGER*2 KTR(1), MSG(6)/'202 PLOTTAP'/
  7    INTEGER * 2 TRALL(10)
  8    LOGICAL*1 TOTLE(106)
  9    INTEGER*4 ITOTLE/'PLOT'/
 10    LOGICAL *1 ITITL(329),TITLE(84),
 11    1SYMBL(47), ITEST(4), ITR(1),
 12    2ISCAL(183), IPES(180),EBC(11)
 13    3JTRHED(48),ISAVEH(48),JHOLD
 14    EQUIVALENCE (ITEST(1),JTEST(1),
 15    1KTEST(1), (PESOS(1),IPES(1))
 16    EQUIVALENCE (ITRHED(1),JTRHED(1))
 17    DATA ITITL/8,20,34,65,127,65,65,126,
 18    165,65,126,65,65,126,127,65,64,64,64,
 19    265,127,126,65,65,65,65,65,126,127,
 20    364,64,126,64,64,127,127,64,64,124,
 21    464,64,64,127,65,64,64,71,65,127,65,
 22    565,65,127,65,65,65,28,8,8,8,8,8,28,
 23    61,1,1,1,1,65,127,65,66,68,120,68,66,
 24    765,64,64,64,64,64,127,65,99,85,73,65,
 25    865,65,65,97,81,73,71,67,65,127,65,65,65,
 26    965,65,127,126,65,65,126,64,64,64,127,65,
 27    A65,65,65,69,67,127,126,65,65,26,68,66,65,
 28    B62,65,65,64,62,1,65,62,127,8,8,8,8,8,65,
 29    C65,65,65,65,65,62,65,65,65,34,20,8,65,
 30    D65,65,73,85,99,65,65,34,20,8,34,65,65,
 31    E34,20,8,8,8,127,2,4,8,16,32,127,28,34,
 32    F65,65,65,34,28,8,24,8,8,8,8,28,62,65,1,
 33    G28,32,64,127,127,1,1,14,1,65,62,6,10,18,
 34    H34,127,2,2,127,64,64,126,1,65,62,62,65,
 35    164,126,65,65,62,127,65,1,2,4,8,8,62,65,
 36    J65,62,65,65,62,62,65,65,63,1,65,62,1,2,4,
 37    K8,16,32,64,0,0,127,0,0,0,0,0,0,0,8,
 38    L0,0,0,0,0,0,4,8,16,16,16,8,4,16,8,4,4,
 39    M4,8,16,0,0,62,0,61,0,0,0,0,0,8,8,16,
 40    N0,0,8,62,0,0,0,0,24,0,24,0,0,87,117,87,
 41    00,87,117,87/
 42    DATA SYMBL/'ABCDEFGHIJKLMNOP-
                  QRSTUVWXY01,1
 43    123456789/-.()=, +?3'/
 44    DATA ISCAL/'SEC .1 .2 .3 .4 .5 .6 .7,
 45    1 .8 .91.01.11.21.31.41.51.61.71.81.92.0,
 46    22.12.22.32.42.52.62.72.82.93.03.13.23.3,
 47    33.43.53.63.73.83.84.04.14.24.34.44.54.6,
 48    44.74.84.95.05.15.25.35.45.55.65.75.85.9,
 49    5 6'/,TRAIL/'END OF JOB 1
 50    6                   '/,IFRST/1/,EBC/'1,
 51    723456789'/
 52    GO TO(9,99,999),IFRST
 53  9 IFRST=IFRST-1
 54    DO 10 I=.180
 55 10 IPES(I)=EBC(1)
 56    ITI=0
 57    DO 2 I=1,4
 58  2 JTRHED(I)=0
 59    CALL MOVE(1,JTRHED(2),TITLE(65),3)
 60    CALL BCDBIN(KTI,JTRHED(1))
 61    ITRW=192/KTI
 62    CALL BINBCD(ITRW,IPES(91))
 63    DO 3 I=1,4
 64  3 JTRHED(I)=0
 65    CALL MOVE(1,JTRHED(3),ITR(21),2)
 66    CALL BINBCD(JTRHED(1),JTRHED(5))
 67    CALL MOVE(1,IPES(161),JTRHED(7),2)
 68    IPES(154)=EBC(2)
 69    CALL MOVE(1,JTRHED(5),ITR(19),2)
 70    ISTOP=ITRHED(5)*ITRHED(2)
 71    CALL BUNBCD(ISTOP,JTRHED(1))
 72    CALL MOVE(1,IPES(155),JTRHED(3),6)
 73    CALL MOVE(1,IPESOS(1),ITOTLE,4)
 74    CALL MOVE(1,IPES(18),TITLE(78),3)
 75    IPES(17)=SYMBL(18)
 76    CALL MOVE81,IPES(83),TITLE(61),4)
 77    CALL MOVE(1,IPES(88),TITLE(65),3)
 78    CALL MOVE(1,IPES(100),TITLE(68),1)
 79    CALL MOVE(1,IPES(111),TITLE(69),2)
 80    CALL MOVE(1,IPES(113),TITLE)71),4)
 81    CALL MOVE(1,IPES(117),TITLE(75),2)
 82    IPES(104)=SYMBL(25)
 83    IPES(105)=SYMBL(5)
 84    IPES(106)=SYMBL(19)
 85    IPES(165)=EBC(5)
 86    IPES(166)=EBC(7)
```

```
-continued
 87    IPES(167)=EBC(6)
 88    IPES(168)=EBC(6)
 89    IPES(170)-EBC(3)
 90    IPES(97)=EBC(7)
 91    IPES(98)=EBC(2)
 92    DO 100 I=1,4
 93 100 IPES(1+132)=EBC(11)
 94    CALL LBOPEN(LUPLT)
 95    CALL WRTAPE(LUPLT,IPESOS,180)
 96    ITR(49)=-127
 97    CALL MOVE(1,ITR(50),ITR(49),2999)
 98    DO 12 I=1,48
 99 12 JTRHED(I)=EBC(1)
100    JTRHED(1)=EBC(4)
101    JTRHED(2)=EBC(3)
102    JTRHED(23)=EBC(3)
103    JTRHED(24)=EBC(7)
104    JTRHED(25)=EBC(2)
105    JTRHED(26)=EBC(2)
106    JTRHED(32)=EBC(2)
107    JTRHED(34)=EBC(6)
108    JTRHED(36)=EBC(2)
109    JTRHED(38)=EBC(2)
110    JTRHED(42)=EBC(2)
111    JTRHED(29)=EBC(6)
112    JTRHED(30)=EBC(10)
113    CALL MOVE(1,ITR(1),ITRHED(1),48)
114    DO 13 I=1,14
115    CALL WRTAPE(LUPLT,ITR,1548)
116    ITR(2)=EBC(2)
117 13 CONTINUE
118    ITR(2)=EBC(3)
119    ITR(29)=EBC(3)
120    ITR(30)=EBC(8)
121    CALL WRTAPE(LUPLT,ITR,1548)
122    CALL WRTAPE(LUPLT,ITR,1548)
123    ITR(1)=EBC(3)
124    ITR(2) = EBC(3)
125    ITR(29)=EBC(5)
126    ITR(39)=EBC(49
127    CALL ANOT(LUPLT,TITLE,TOTLE)
128    DO 21 II=1,7
129    ITR(49)=-127
130    CALL MOVE(1,ITR(50),ITR(49),1499)
131    ISTRT=49
132    DO 20 JJ=1,106
133    DO 14 KK=1,46
134    IF(TITLE(JJ).EQ.SYMBL(KK))GO TO 15
135 14 CONTINUE
136 15 INDX=(KK-1)*7+1+(II-1)
137    ITEST(3)=ITITL(INDX)
138    DO 18 MM-1,8
139    JTEST(1)=0
140    KTEST(1)=KTEST(1)*2
141    IF(JTEST(1))18,18,16
142 16 ITR(ISTRT)=127
143 18 ISTRT=ISTRT+1
144 20 CONTINUE
145    IF (II.NE.7)GO TO 2111
146    ITR(39) = EBC(11)
147    ITR(40) = EBC(8)
148 2111 CALL WRTAPE(LUPLT,ITR,1548)
149    ITR(2)=EBC(29
150 21 CONTINUE
151    ITR(49)=-127
152    CALL MOVE(1,ITR(50),ITR(49),2999)
153    ITR(1) = EBC(49
154    ITR(2) = EBC(3)
155    ITR(23)=EBC(3)
156    ITR(24)=EBC(7)
157    ITR(34)=EBC(4)
158    ITR(39)=EBC(6)
159    ITR(40)=EBC(8)
160    CALL WRTAPE(LUPLT,ITR,1548)
161    ITR(49)=-127
162    CALL MOVE(1,ITR(50),ITR(49),2999)
163    JTRHED(1 = EBC(4)
164    JTRHED(2)=EBC(39
165    JTRHED(23)=EBC(5)
166    JTRHED(24)=EBC(2)
167    JTRHED(25)=EBC(2)
168    JTRHED(26)=EC(2)
```

```
169     JTRHED(29)=EBC(1)
170     JTRHED(30)=EBC(6)
171     JTRHED(34)=EBC(3)
172     JTRHED(39) = EBC(1)
173     JTRHED(40) = EBC(19
174     JTRHED(42) = EBC(4)
175     CALL MOVE(1,itr(1),ITRHED(1),489
176     CALL GRAYS(ITR(49))
177     CALL WRTAPE(LUPLT,ITR,2000)
178     CALL WRTAPE(LUPLT,ITR(2001),1048)
179     ITR(49)=-127
180     CALL MOVE(1,ITR(50),ITR(49),2999)
181     JTRHED(1)=EBC(4)
182     JTRHED(2)=EBC(39
183     JTRHED(29)=EBC(8)
184     JTRHED(30)=EBC(6)
185     JTRHED(34)=EBC(4)
186     CALL MOE(1,ITR(1),ITRHED(1),48)
187     DO 22 I=1,14
188     CALL WRTAPE(LUPLT,ITR,2000)
189     CALL WRTAPE(LUPLT,ITR(20001),1048)
190     ITR(2)=EBC(29
191  22 CONTINUE
192     ITR(1) = EBC(15)
193     ITR(2) = EBC(3)
194     DO 32, II=1,7
195     ITR(49)=-127
196     CALL MOVE(1,ITR(50),ITR(49),2999)
197     ISTRT=49
198     DO 29 JJ=1,61
199     ndex=(JJ-1) * 3+1
200     DO 27 KK=1,3
201     DO 23 LL=1,40
202     IF(ISCAL(NDEX).Eq.SYMBL(LL))GO TO24
203     CONTINUE
204  24 INDX=(LL-1)*7+1+(II-1)
205     ITEST(3)=ITITL(INDX)
206     DO 26 NN=1,8
207     JTEST(1)=0
208     KTEST(I)=KTEST(1)*2
209     IF(JTEST(1))26,26,25
210  25 ITR(ISTRT)=127
211  26 ISTRT=ISTRT+1
212  27 INDEX=NDEX+1
213     IF(JJ.EQ.1)GO TO 28
214     IF(JJ.EQ.60)GO TO 28
215     ISTRT=ISTRT+26
216     GO TO 29
217  28 ISTRT=ISTRT + 14
218  29 CONTINE
219     IF(II.EQ.7)GO TO 30
220     GO TO 31
221  30 ITR(3048)=127
222     ITR(2)=EBC(3)
223     ITR(39)=EBC(39
224     ITR(40)=EBC(4)
225   1 &A-- O-OA-&&-O--OO&O-02000-
226     CALL WRTAPE(LUPLT,IRT(2001),1048)
227     ITR(2)=EBC(2)
228  32 CONTINUE
229     RETURN
230  99 IFRST=IFRST+1
231     DO 900 I=1,48
232 990 JTRED(I)=EBC(1)
233     JTRHED(2)=EBC(3)
234     IF(TITLE(77).EQ.EBC(1))TITLE(77)=EBC(4)
235     IF(TITLE(77).EQ.EBC(2))TITLE(77)=EBC(4)
236     JHOLD=TITLE(7)
237     JTRHED(32)=TITLE(77)
238     CALL MOVE(1,ITRHED(13),ITR(19),2)
239     CALL MOVE(!,itrhed(17),ITR(21),2)
240     IHOLD=ITRHED(13)
241     ISAMP=IHOLD
242     CALL BINBCD(IHOLD,TRAAL(1))
243     CALL MOVE(1,ITRHED(12),TRAAL(1),4)
244     IHOLD=ITRHED(17)
245     CALL BINBCD(IHOLD,TRALL(1))
246     CALL MOVE(1,ITRHED(17),TRAAL(2),2)
247     CALL MOVE(1,JTRHED(28),TITLE(65),3)
248     INO=(ISAMP+48)/2000
249     ILEFT=(ISAMP+48)-(INO *2000)
250     IF(ILEFT.EQ.O)GO TO 33
251     INOBLK=INO-1
252     GO TO 330
253  33 INOBLK=INO
254 330 JTRHED(42)=EBC(INOBLK+2)
255  34 ISEQ=1
256     GO TO 35
257 999 IF(ICLOSE)35,35,39
258  35 IF(INORM)350,350,360
259 360 IKTR=KTR(1)
260     IMAX=IABS(IKTR)
261     DO 361 !=2,ISAMP
262     IKTR=KTR(I)
263     IKTS=IABS(IKTR)
264     IF(IKTS.LE.IMAX0GO TO 361
265     IMAX=IKTS
266 361 CONTINUE
267     IF(IMAX.EQ.O)go to 351
268     FACT=127.0/FLOAT(IMAX)
269     DO 362 I=1,ISAMP
270 362 KTR(I)=KTR(I)*FACT
271 350 J=50
272     LIMIT=ISAMP+48
273     DO 36 I=49,LIMIT
274     ITR(I)=ITR(J)
275  36 J=J+2
276 351 CALL MOVE(1,ISAVEH(1),ITR(1),48)
277     CALL BINBCD(ISEQ,JTRHED(17))
278     CALL MOVE(1,ITR(1),ITRHED(1),48)
279     IF(JHOLD.EQ.TITLE(77))GO TO 380
280     JHOLD=TITLE(7)
281     ITR(32)=TITLE(77)
282     ITR(2)=EBC(39
283 380 CONTINUE
284     M-1
285     IF(INO.EQ. O)GO TO 375
286     DO 37 I=1,INO
287     CALL WRTAPE(LUPLT,ITR(M),2000)
288  37 M=M+2000
289     IF(ILEFT.EQ. O)GO TO 370
290 375 CALL WRTAPE(LUPLIT,ITR(M),ILEFT)
291 370 CONTINUE
292  38 JTRHED(2)=EBC(29
293     ISEQ=ISEQ+1
294     CALL MOVE(1,ITR(1),ISAVEH(1),489
295     RETURN
296  39 CALL WRTAPE(LUPLT,TRAIL,40)
297  40 CALL LBCLOS(LUPLT)
298     PRINT 1000
299 1000 FORMAT(X, 'A PLOT TAPE HAS BEEN ')
        CREATED')
300     IFRST = 1
301     RETURN
302     END
```

The following statements refer to this program listing (again in Fortran IV):

The arguments for the subroutine are as follows:

ITR—An integer file passed from the subroutine DRPLOT.

LUPLT—Assignment of logical unit for the output file.

TITLE—An input file of 80 bytes of logical one data containing information for identification purposes and specific plotting parameters required by the plotting program.

ICLOSE—An integer value which if set to zero (0) indicates that the file being processed is not the last file; if set to one (1), the file being processed is the last file.

INORM—An integer value indicating that the input file is not to be normalized if INORM=0; the input file is to be normalized if INORM=1. The file is normalized base on the maximum absolute value.

KTR—Array equivalenced to the input file starting at sample 25.

Lines 3–51 allocate storage for arrays used for plot information and identification, and the storage of input and output data files.

Line 52 determines if this is the first, second, or subsequent file being processed. If this is the first file, then physical records must be written to tape containing the plot parameters required by the plot program and also plot identification traces are written to tape.

Lines 53–93—On the first pass into the program, a record is built containing the plot parameters. This is an 180-byte record. Subroutine MOVE is used to transfer data internally from the location given by the third argument in the call to the location given by the second argument in the call. The number of bytes moved is given by the fourth argument in the call. (MOVE is in this case the FORTRAN equivalent of the COBOL statement MOVE. See for the latter pp. 197 to 199 of IBM Systems Reference Library File No. S360-24, Order No. GC28-6396-4, copyrighted 1972). Subroutine BINBCD and subroutine BCDBIN are routines of a well known type used to convert binary number to EBCDIC code and vice versa, respectively. Subroutine BUNBCD is the same as BINBCD except it allows an 8-byte character.

Line 94 causes the corporate labels on the tape to be read and tape readied to accept data.

Line 95 writes to tape on logical unit LUPLT from array IPESOS, 180 bytes of data.

Lines 96–113 initialize header arrays for the writing of identification traces.

Lines 114–117 write 14 white traces to the output tape, to be plotted at 48 traces per inch.

Lines 118–122 write 2 white traces to the output tape to be plotted at 16 traces per inch.

Lines 123–150 build and output 7 identification traces to be plotted at 32 traces per inch. Subroutine ANNOT is used to build a 1096-byte identification array containing a plot title, volume serial number of the plot tape, data set name of the output data set, job name, current data at time of execution, and time of execution. (Again a functionally well known routine in this art).

Lines 151–160 build and output one white trace for separating identification traces and the gray scale traces.

Lines 161–178 build and output a gray scale going from black to white onto the plot tape. Subroutine GRAYS builds a 1500-byte array containing values linearly decreasing from +127 to −127.

Lines 179–191 build and output 14 white traces with 3000 samples per trace to be plotted at 64 traces per inch.

Lines 192–266 build and output 7 timing scale traces. This is the last of the identification traces.

Lines 227–256 prepare the seismic trace headers for output to plot tape. All identification traces have been created at this point. (This is the entry point if second time into routine).

Lines 257–275—If required by user, the program will normalize the input data to ±127, by determining the maximum value of the input data and scaling linearly.

Lines 276–295 write the normalized or unnormalized trace to the plot tape, returning to process next file if it exists.

Lines 296 to end close plot tape if last file has been processed. (Routine WRTAPE is simply a utility routine which writes a single record to tape in internal machine format. The first parameter is the logical unit, the second is the address of the data, and the third parameter is the number of bytes to be written).

Figure 4:
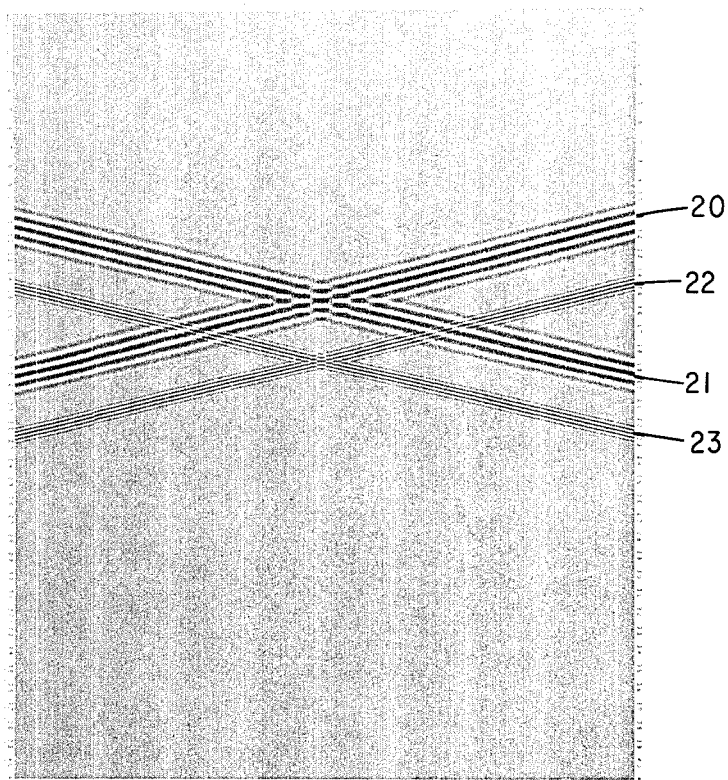
FIG. 4 shows the two-dimensional plot of synthetic data prepared for a test of this method.
Figure 5:
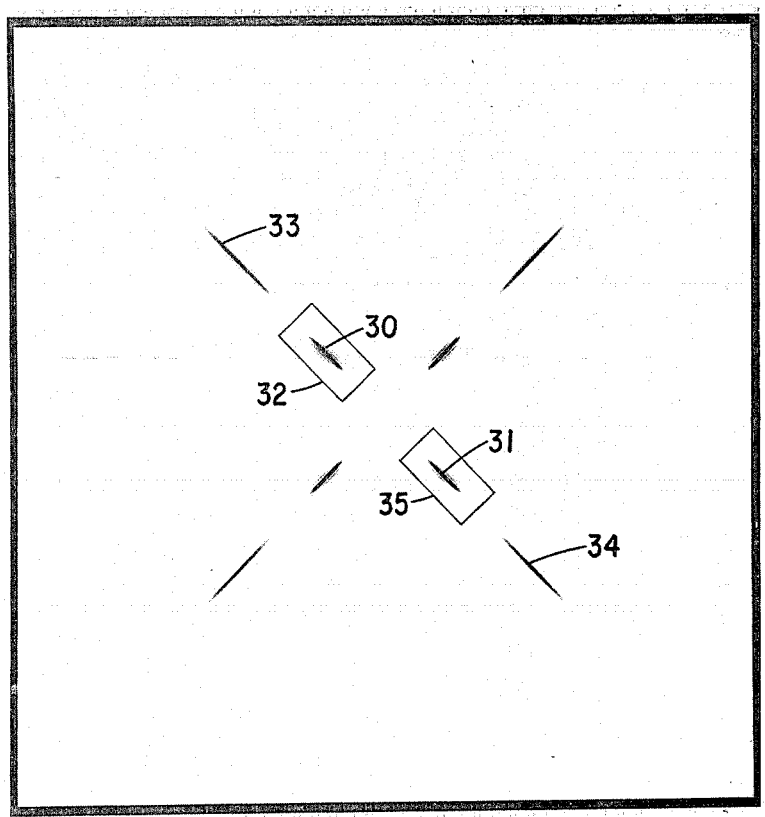
FIG. 5 is the f-k plot of the discrete Fourier transform of the data plotted in FIG. 4.

Having given the computer manipulation of the input data, I now give an example showing that the operation of this method does, in fact, filter in two dimensions an array of data and removes the undesired components from visual representation. FIG. 4 shows a plot in two dimensions of a synthesized set of data which is presented in the time domain. (Distance is plotted horizontally, time vertically downward). This plot contains the traces of reflected waves of two oppositely dipping, reflecting beds in which the spatial frequency is relatively low (traces 20 and 21), and traces of two other sets of reflected waves from oppositely dipping, reflecting beds of higher spatial frequency and lower amplitude (traces 22 and 23), lying below beds 20 and 21, respectively. These data thus present in a very simple form the problem to which spatial filtering as above discussed is desirable for geophysical data: How can one eliminate "masking" or interfering waves from the final visual presentation, so that the desired reflections can be clearly followed? In FIG. 4, one might like to eliminate, for example, traces of those traveling waves resulting from dip in an undesired direction, regardless of amplitude, and without affecting the traces of the remaining waves. Here, this would require elimination of traces 21 and 23. One might alternatively wish to eliminate selected traces, as, for example, traces 20 and 23, and so on. My method provides this in the handling of seismic or holographic data, or the like. Referring back to FIG. 1, the data for the survey, such as that plotted in FIG. 4, are formatted for acceptance in program FF1024P (11 in FIG. 1), and the resultant discrete Fourier transform of the real data are formed into plot tape by use of program PLOTKK (12, FIG. 1) and plotted on plotter 17. The resultant plot of the transformed data is shown in FIG. 5. Because the data are all real, this f-k plot is symmetric (the white line across the middle is a simple mechanical result of the top and bottom halves of this plot having been made separately and then joined, the line of joinder still appearing).

Figure 6:
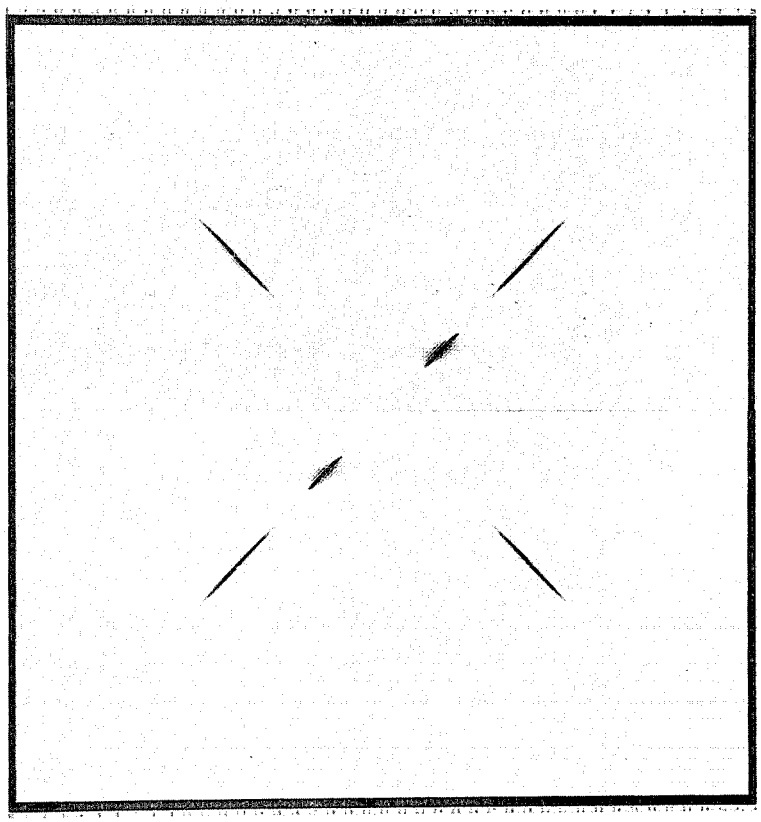
FIG. 6 shows the plot of the data shown in FIG. 5 after filtering spatially as taught in this method.
Figure 7:
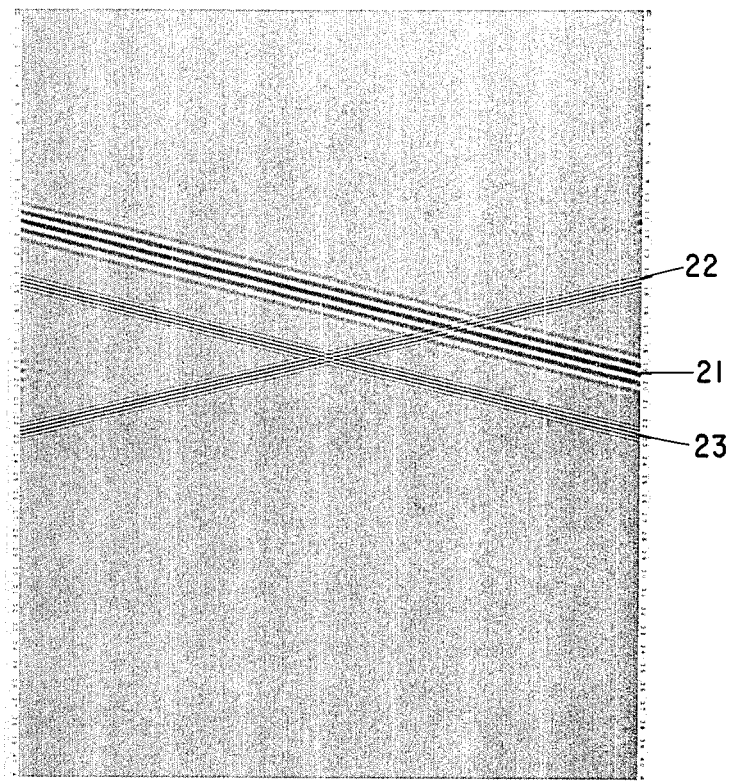
FIG. 7 gives the time domain plot of the data of the f-k plot of FIG. 6.

Now, to eliminate a trace from FIG. 4, one draws a polygon (under the conditions earlier given for number of vertices and internal angles), surrounding the trace ("trace" here meaning a feature of the spectrum) on the f-k plot it is desired to omit. For example, traces 30 and 31 on FIG. 5 correspond to trace 20 on FIG. 4. Determining the positions of the four vertices of the quadrilateral 32, which is a size just sufficient to eliminate undesired data while keeping all other data, and inserting this in program POLYFIL (13, FIG. 1), with the program parameter IOPT set to zero (reject) and at step 15 reading in the vertex coordinates shown, causes the transformed data passed through POLYFIL to lose the data shown by traces 30 and 31. This can be proved by replotting the filtered transform data (as is shown on FIG. 6); ordinarily this is considered unnecessary. Accordingly, the next step is usually to re-transform the filtered transformed data back to the time domain by inverse use of the program FF102P, (14 in FIG. 1). The filtered data are then ready for presentation. A plot of these data is shown in FIG. 7, where it can be seen that trace 20 has been completely filtered out, the other traces still remaining.

To eliminate both trace 20 and 22 would require the quadrilaterals 32 and 35 of FIG. 5 to be enlarged to include both traces 33 and 34 within the rectangles. Mathematically, this just means relocating coordinates of two vertices per quadrilateral.

Figure 8:
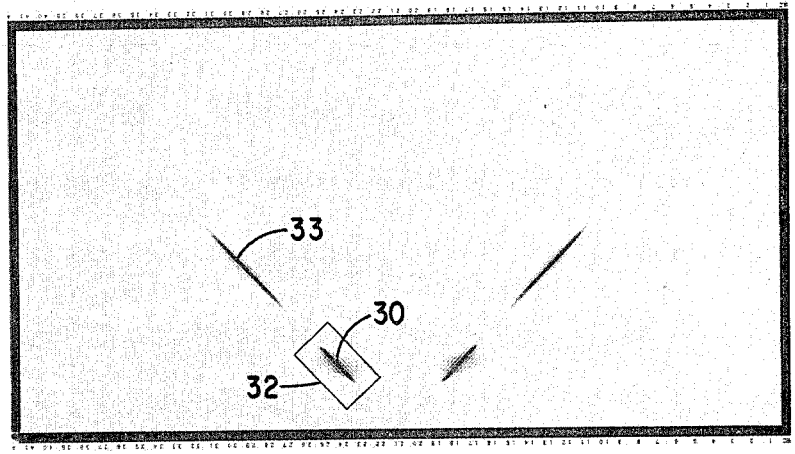
FIGS. 8 and 9 are the half plots corresponding respectively to the top halves of FIGS. 5 and 6.

Now, while the complete plot of the transform data are required when the input data have both real and imaginary components (i.e., complex data such as found in earth holography), this is not required due to symmetry when only real data (e.g., that for seismic sections) are to be filtered. In this latter case, I prefer to prepare only half of the f-k plot, as shown in FIG. 8. The program PLOTKK can be modified to handle this by stopping it after 512 plotted traces. Then, a determination of the vertices of the polygon (quadrilateral in this case) 32 is carried out as stated before, and these data inserted in the program.

Figure 9:
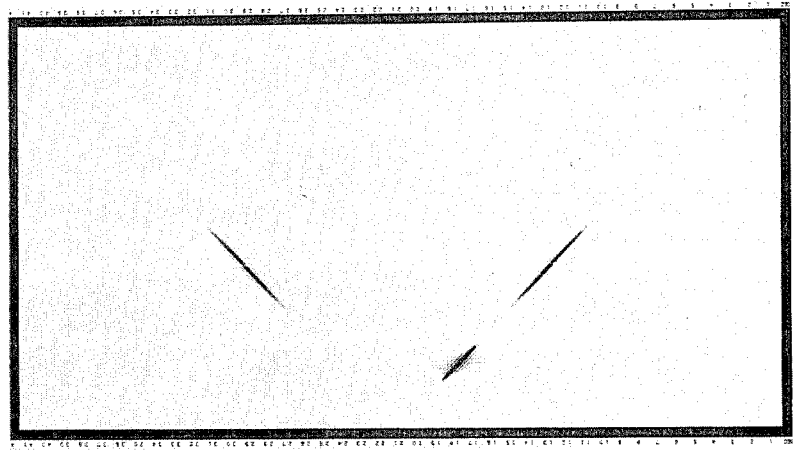

FIG. 9 shows the f-k half plot after filtering out trace 30, corresponding to FIG. 8. The resultant plot of the re-transformed data has already been shown as FIG. 7.

Further examples could be given, but it is believed the above discussion illustrates that the overall method performs as desired.

It has been mentioned and should be clearly understood that this computer-implemented method can be used for any kind of two-dimensional data where a Fourier transform permits spatial filtering of certain traveling waves. It is not necessary that the form of polygon be regular or have any particular shape. This shape (and associated vertices) can be adjusted for removal (or retention) of any waves which form a pattern on the plane where the Fourier-transformed data can be displayed.

I claim:

1. An automatic computer-implemented process for filtering two-dimensional data arising from the reception of traveling waves at a plurality of receiver locations comprising:
   (a) automatically computing the Fourier transform of said data to produce the values associated with the spatial frequency and wave number corresponding to the time and distance coordinates of said data;
   (b) selectively zeroing in the transformed data obtained in step (a) all data in only one of two sets collectively comprising the total of said transform data, which sets consist essentially of (1) all transform data the spatial frequency and wave number coordinates of which are within the boundaries defined by plurality of arbitrarily chosen vertices of specified spatial frequency and wave number, and (2) the rest of said transform data;
   (c) automatically computing the inverse Fourier transform of the data from step (b), whereby the output data from this step (c) may be plotted to form a visual representation of said travelling waves with selectively removed data filtered therefrom; and
   (d) plotting the output data from step (c), thus forming said visual representation of the filtered two-dimensional data.

2. An automatic computer-implemented process for filtering two-dimensional data, as set out in claim 1, in which said chosen vertices define in the spatial frequency-wave number plane a polygon of arbitrary shape as to sides and vertices but each interior angle of said polygon is less than 180°.

3. An automatic computer-implemented process for filtering two-dimensional data including the steps of:
   (a) automatically computing the Fourier transform of said data to produce the values associated with the spatial frequency and wave number corresponding to the time and distance coordinates of said data;
   (b) automatically and selectively zeroing in the transformed data obtained in step (a), all data in only one of two sets collectively comprising the total of said transform data, which sets consist essentially of (1) all transform data the spatial frequency and wave number coordinates of which are within the boundaries of a polygon defined by plurality of arbitrarily chosen vertices of specified spatial frequency and wave number, and (2) the rest of said transform data;
   (c) automatically computing the inverse Fourier transform of the data from step (b), whereby the output data from this step (c) may be plotted to form a visual representation of said travelling waves with the selectively removed data filtered therefrom;
   (d) defining a border of arbitrary width surrounding said polygon;
   (e) automatically modifying the amplitude of all data points the spatial frequency and wave number coordinates of which lie on or within said border by multiplication by an arbitrarily chosen function of maximum value $+1$ and minimum value 0, which smoothly varies in amplitude, depending on the distance from each of said data points to the nearest point on the perimeter of said polygon, step (e) being completed after step (a) and before the start of step (c); and
   (f) plotting the output data from step (c), thus forming said visual representation of the filtered two-dimensional data.

4. An automatic computer-implemented process for filtering two-dimensional data as set out in claim 3, in which said two-dimensional data are real (that is, are not complex) and half only of said Fourier transform in step (a) is plotted, namely that having zero or a positive spatial frequency.

5. A process in accordance with claim 3 including the step of automatically forming a visual representation of the amplitude of the Fourier transform of said input data (i.e., a plot of such data in the spatial frequency-wave number plane), whereby the user can determine the desired values of the coordinates of said vertices employed in step (b).

6. In earth exploration using the arrival of traveling waves at detectors at a plurality of locations spaced in a detector spread, from which a two-dimensional visual display of amplitude of said waves in terms of the position of said detector locations is made, the method of spatially filtering the traveling wave arrival data obtained at said detectors, including the steps of:
   (a) producing a plurality of sets of electric signals corresponding to the arrival of said travelling waves at said detectors so that each set contains in terms of amplitude and time the effect of said waves impinging on one or more detectors positioned at a location in said spread,
   (b) automatically producing in a suitably programmed digital computer (the input data to which is said plurality of sets of electric signals) the Fourier transform of said data into a corresponding plurality of amplitudes in terms of frequency and wave number,
   (c) automatically modifying in a suitably programmed digital computer said amplitudes produced in step (b) to decrease said amplitudes essentially to zero inside or outside a region defined in terms of frequency and wave number in the Fourier transform plane by a plurality of straightline segments defining an area of polygonal shape containing a plurality of vertices (with all internal angles less than 180°) defining in terms of frequency and wave number the perimeter of said area, (d) automatically producing in a suitably programmed digital computer, the input data to which is the data produced in step (c), the inverse Fourier transform of said data, from which may be prepared a two-dimensional visual display of amplitude of said waves in terms of the position of said detector locations, from which by spatial filtering the effect of undesired waves has been removed, and (e) plotting the output data from step (d), thus forming said visual display of said filtered two-dimensional data.

7. A method in accordance with claim 6 including the step of decreasing said amplitudes in said Fourier transform plane within a border of arbitrary width by a mathematical function having extremes of +1 and 0, the value of said function at any point in said border depending only on the ratio of the distance of said point to the perimeter of said area, to the width of said border.

8. A method in accordance with claim 7 including the step of producing a two-dimensional visual presentation of the data forming the output of step (b) in said Fourier transform plane, by means of which a user of the method may determine in terms of coordinates of frequency and wave number the desired vertices of said polygonal area.

* * * * *

UNITED STATES PATENT OFFICE
CERTIFICATE OF CORRECTION

PATENT NO. : 4,218,765  
DATED : August 19, 1980  
INVENTOR(S) : Robert Roy Kinkade It is certified that error appears in the above-identified patent and that said Letters Patent are hereby corrected as shown below:

Column 3, Line 40 - "by" should read "to".
Column 6, Line 29 - "6024" should read "6042".
Column 8, Line 19 - "useed" should read "used".
Column 9, Line 47 - "I" should read "L".
Column 10, Line 58 - "from" should read "form".
Column 11, Line 24 - "T" should read "I".
Column 11, Line 42 - "M" should read "N".
Column 12, Line 12 - "logic" should read "logical".
Column 12, Line 24 - "6" should read "66".
Column 13, Line 16 - "1+10" should read "1. + 10".
Column 14, Line 47 - "rejected" should read "desired".
Column 15, Line 23 - "$S_1$" should read "$S_i$".
Column 15, Line 46 - "$P_{i+1}^1$" should read "$P_{i+1}$".
Column 16, Line 48 - "A(IPT" should read -- A (IPT) --.
Column 16, Line 56 - "SORT" should read "SQRT".
Column 17, Line 16 - "IF(I,LT.NOPTS)GO TO 5" should read "IF(I.LT.NOPTS)GO TO 5".

Column 17, Line 39 - "IF(IOPT.EQ.0.)" should read "(IOPT.EQ.0)".
Column 17, Line 60 - "DMAS" should read "DMAXS".
Column 17, Line 64 - "X(IF)" should read "X(I)".
Column 17, Line 67 - "(OPT" should read "(IOPT".
Column 18, Line 60 - "VI(I)" should read "VB(I)".
Column 22, Line 19 - "(MIN)" should read "(IMIN)".
Column 24, Line 9 - "in" should read "on".
Column 24, Line 41 - "care" should read "card".
Column 24, Line 63 - "PLTRYL" should read "PLTRL".
Column 24, Line 64 - after "B=" and before "(AMAX" insert --(--.
Column 25, Line 8 - ")" at first occurrence should read "(".
Column 25, Line 37 - "calculated" should read "calculate".
Column 25, Line 56 - "INTEGER:4" should read "INTERGER*4"
Column 25, Line 61 - "(20A49" should read "(20A4)".
Column 24, Line 64 - "PLTRYL" should read "PLTRL".

UNITED STATES PATENT OFFICE
CERTIFICATE OF CORRECTION

PATENT NO. : 4,218,765

DATED : August 19, 1980

INVENTOR(S) : Robert Roy Kinkade

It is certified that error appears in the above-identified patent and that said Letters Patent are hereby corrected as shown below:

Column 25, Line 62 - "DO 5 - 1,1524" should read "DO 5 I=1,1524".
Column 25, Line 63 - "5 IT(I)-0" should read "5 IT(I)=0".
Column 25, Line 67 - "DO 6=1,24" should read "DO 6I=1,24".
Column 26, Line 6 - "ITR(16)=I" should read "ITR(16)=1".
Column 26, Line 36 - "files" should read "file".
Column 26, Line 65 - "PLTTCC)" should read "PLTTCC(".
Column 26, Line 67 - "1TRAIL(29),ITI" should read "1TRAIL(20),ITI".
Column 27, Line 2 - "TRALL" should read "TRAAL".
Column 27, Line 10 - "(PESOS(1)" should read "(IPESOS(1)".
Column 27, Line 20 - "26" should read "126".
Column 27, Line 21 - after "8," (last occurrence) and before "65," (last occurrence) add --8,--.
Column 27, Line 22 - after "65," (seventh occurrence) and before "34," add --65,--.
Column 27, Line 23 - after "8," and before "34," (second occurrence) add --20,--.
Column 27, Line 24 - after "8," (third occurrence) and before "127," (first occurrence) add --8,--.
Column 27, Line 26 - "164" should read "I64".
Column 27, Line 29 - "61" should read "62".
Column 27, Line 30 - after "62," and before "0" (second occurrence) add --8,--.
Column 27, Line 32 - after "Y" and before "0" add --Z--.
Column 27, Line 32 - at the end of the line after "," delete "1".
Column 27, Line 33 - "=,+?3'/" should read "=,+:?'/".
Column 27, Line 37 - "84" should read "94".
Column 27, Line 42 - "IFRST-1" should read "IFRST+1".
Column 27, Line 43 - ".180" should read "1,180".
Column 27, Line 60 - "CALL MOVE 81" should read "CALL MOVE(1".
Column 27, Line 64 - ")71)" should read "(71)".
Column 28, Line 3 - "-" should read "=".

UNITED STATES PATENT OFFICE
CERTIFICATE OF CORRECTION

PATENT NO. : 4,218,765

DATED : August 19, 1980

INVENTOR(S) : Robert Roy Kinkade

It is certified that error appears in the above-identified patent and that said Letters Patent are hereby corrected as shown below:

Column 28, Line 8 - "(1+132)" should read "(I+132)".
Column 28, Line 22 - "EBC(2)" should read "EBC(3)".
Column 28, Line 34 - "ITR(39)=EBC(49" should read "ITR(30)=EBC(4)".
Column 28, Line 35 - "ANOT" should read "ANNOT".
Column 28, Line 41 - "TITLE" should read "TOTLE".
Column 28, Line 44 - "-" should read "=".
Column 28, Line 54 - "EBC(29)" should read "EBC(2)".
Column 28, Line 56 - "EBC(49" should read "EBC(4)".
Column 28, Line 64 - "(1" should read "(1)".
Column 28, Line 65 - "EBC(39" should read "EBC(3)".
Column 28, Line 69 - "EC(2)" should read "EBC(2)".
Column 29, Line 6 - "EBC(19" should read "EBC(1)".
Column 29, Line 8 - "itr" should read "ITR".
Column 29, Line 8 - "489" should read "48)".
Column 29, Line 14 - "EBC(39" should read "EBC(3)".
Column 29, Line 17 - "MOE" should read "MOVE".
Column 29, Line 19 - "(20001)" should read "(2001)".
Column 29, Line 20 - "EBC(29" should read "EBC(2)".
Column 29, Line 22 - "EBC(15)" should read "EBC(5)".
Column 29, Line 23 - after "32" and before "II" delete ",".
Column 29, Line 28 - "ndex" should read "NDEX".
Column 29, Line 29 - ".Eq." should read ".EQ.".
Column 29, Line 30 - before "CONTINUE" add --23--.
Column 29, Line 33 - "INDEX" should read "NDEX".
Column 29, Line 43 - "CONTINE" should read "CONTINUE".
Column 29, Line 46 - "EBC(39" should read "EBC(3)".
Column 29, Line 54 - "JTRED(1)" should read "JTRHED(1)".
Column 29, Line 57 - "(7)" should read "(77)".
Column 29, Line 60 - "(!,itrhed" should read "(1,ITRHED".
Column 29, Line 65 - "TRALL" should read "TRAAL".
Column 30, Line 1 - "INO-1" should read "INO+1".

UNITED STATES PATENT OFFICE
CERTIFICATE OF CORRECTION

PATENT NO. : 4,218,765

DATED : August 19, 1980

INVENTOR(S) : Robert Roy Kinkade

It is certified that error appears in the above-identified patent and that said Letters Patent are hereby corrected as shown below:

Column 30, Line 11 - "DO 361 !" should read "DO 361 I".
Column 30, Line 13 - "0" (first occurrence) should read ")".
Column 30, Line 16 - "go" should read "GO".
Column 30, Line 26 - "Title(7)" should read "Title(77)".
Column 30, Line 28 - "EBC(39" should read "EBC(3)".
Column 30, Line 29 - "M-1" should read "M=1".
Column 30, Line 34 - "LUPLIT" should read "LUPLT".
Column 30, Line 36 - "EBC(29" should read "EBC(2)".
Column 30, Line 38 - "489" should read "48)".
Column 30, Line 43 - after "BEEN" and before "CREATED" delete "')".
Column 30, Line 64 - "base" should read "based".
Column 31, Line 53 - "Lines 192-266" should read "Lines 192-226".

Signed and Sealed this

First Day of December 1981

[SEAL]

Attest:

Attesting Officer

GERALD J. MOSSINGHOFF

Commissioner of Patents and Trademarks